United States Patent [19]
Oshima et al.

[11] Patent Number: 6,003,054
[45] Date of Patent: Dec. 14, 1999

[54] PROGRAMMABLE DIGITAL CIRCUITS

[75] Inventors: Hiroyasu Oshima, Ishikawa; Hodaka Murakoshi, Gunma; Shuji Nishi, Nara, all of Japan

[73] Assignee: Kanazawa Institute of Technology, Ishikawa, Japan

[21] Appl. No.: 09/025,258

[22] Filed: Feb. 18, 1998

[51] Int. Cl.⁶ .................................................. G06F 7/38
[52] U.S. Cl. ........................................ 708/230; 708/490
[58] Field of Search ............................... 708/1, 100, 200, 708/230–236, 306–307, 490, 446, 443, 444, 800–804

[56] References Cited

U.S. PATENT DOCUMENTS

| | | | |
|---|---|---|---|
| 3,676,656 | 7/1972 | Schmidt | 708/234 |
| 3,883,724 | 5/1975 | Pradhan et al. | 708/1 |
| 3,965,338 | 6/1976 | van Gerwen et al. | 708/307 |
| 4,315,320 | 2/1982 | Gabriel | 708/802 |

OTHER PUBLICATIONS

Huskey, et al., Computer Handbook, "The Digital Differential Analyzer", (1962), pp. 14–74.
S. Yaskawa et al., "A real–time parallel processing system, PIM and its application to a large–scale railroad operation simulator", Dec. 1997, pp. 1–6.

*Primary Examiner*—Tan V. Mai
*Attorney, Agent, or Firm*—Foley & Lardner

[57] ABSTRACT

A composite digital network including an integrating circuit, a summing circuit and a coefficient circuit is formed as an integrated circuit that provides a selected one of digital arithmetic circuits that perform different arithmetic operations depending upon coefficients of the coefficient circuits. A plurality of units of such composite digital networks may be connected in rows, columns or layers to provide an expanded network. In a method of producing such a composite digital network, basic digital arithmetic circuits that respectively correspond to various types of basic analog arithmetic circuits are defined based on Kirchhoff's rules, for example, and these basic digital arithmetic circuits are coupled to each other via a coefficient circuit to thus provide a generic digital arithmetic integrated circuit.

24 Claims, 37 Drawing Sheets

FIG. 1A

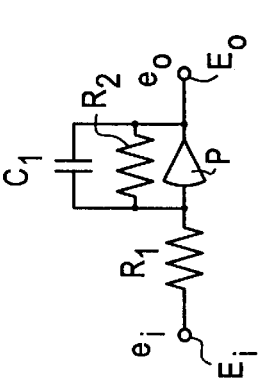

Basic analog arithmetic first-order lag integration circuit (A1)

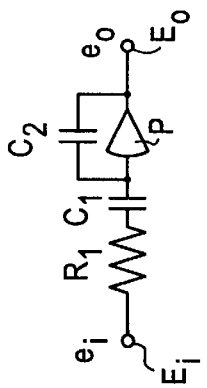

Basic analog arithmetic first-order lag integration circuit (A2)

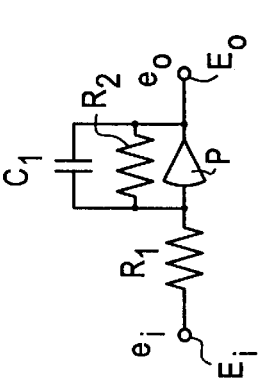

Basic analog arithmetic proportional integration circuit (A3)

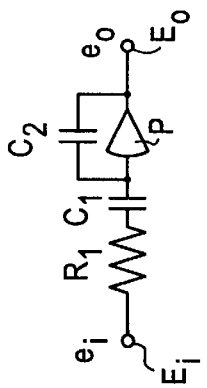

Basic analog arithmetic proportional integration circuit (A4)

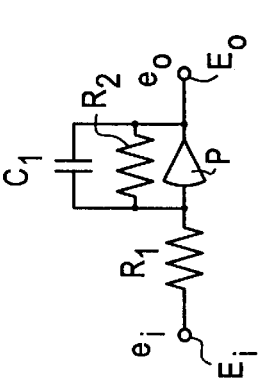

Basic analog arithmetic approximate differentiation circuit (A5)

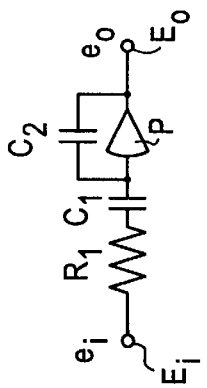

Basic analog arithmetic approximate differentiation circuit (A6)

FIG. 1B
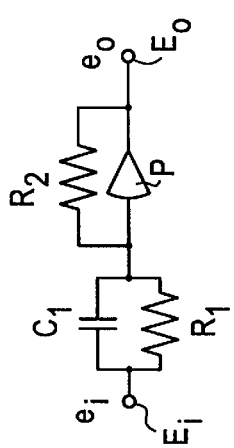
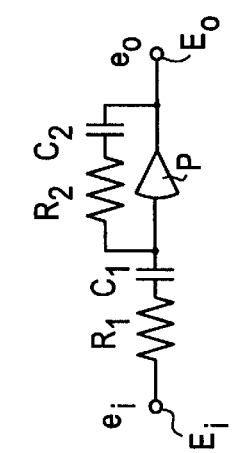
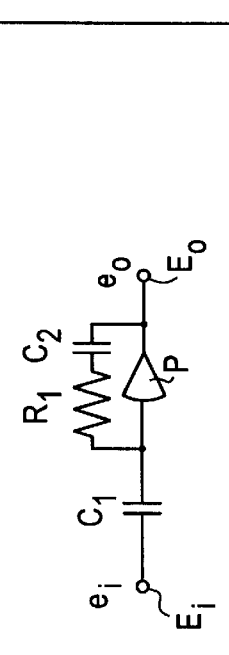
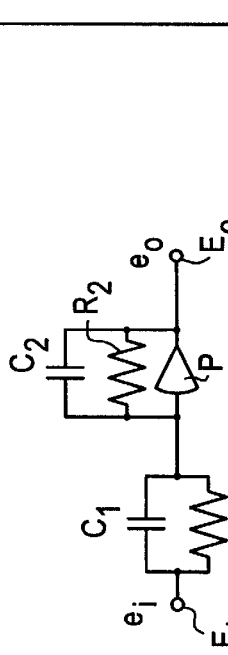
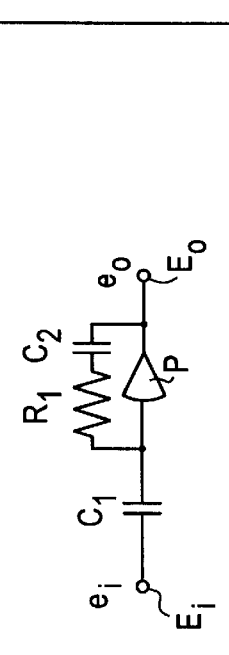
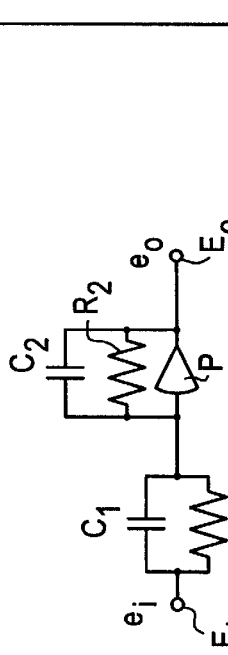

FIG. 3
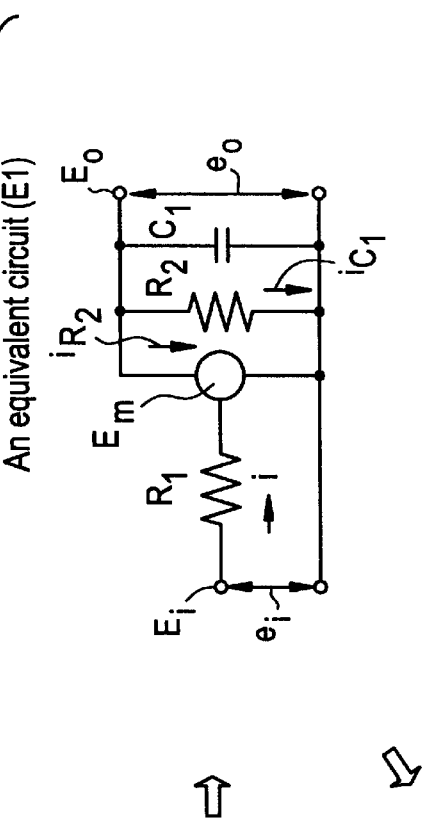
The basic analog first-order lag integration circuit (A1)
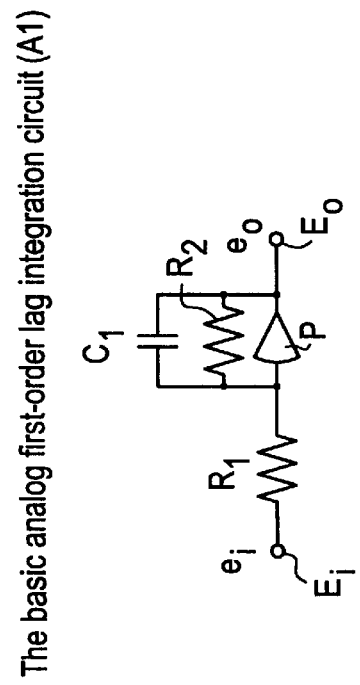
The voltage-current relationships (F1)
$$i = \frac{e_i}{R_1}$$
$$i = -i_{C_1} - i_{R_2}$$
$$\frac{e_i}{R_1} = -C_1 \frac{de_o}{dt} - \frac{e_o}{R_2} \quad \cdots \text{①}$$
Formula ① is modified into following formula:
$$\frac{de_o}{dt} = -\frac{e_i}{C_1 R_1} - \frac{e_o}{C_1 R_2}$$
An equivalent circuit (E1)
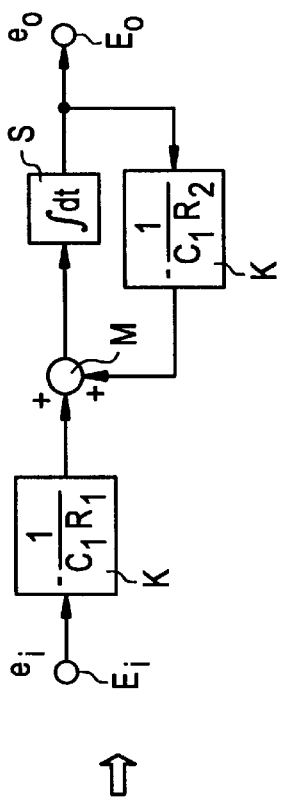
The basic digital first-order lag integration circuit (D1)

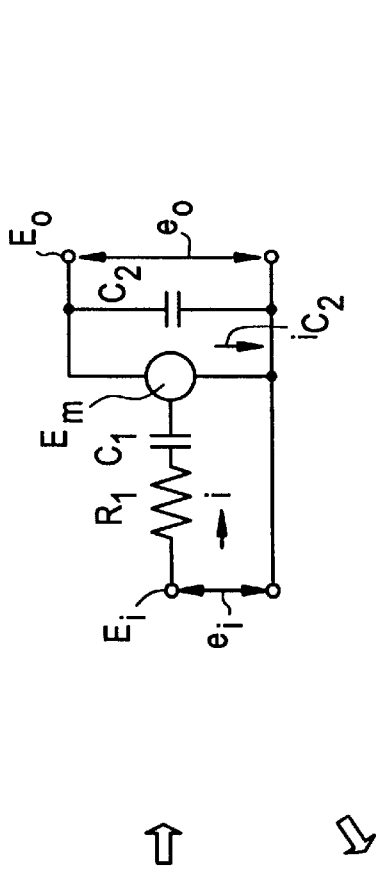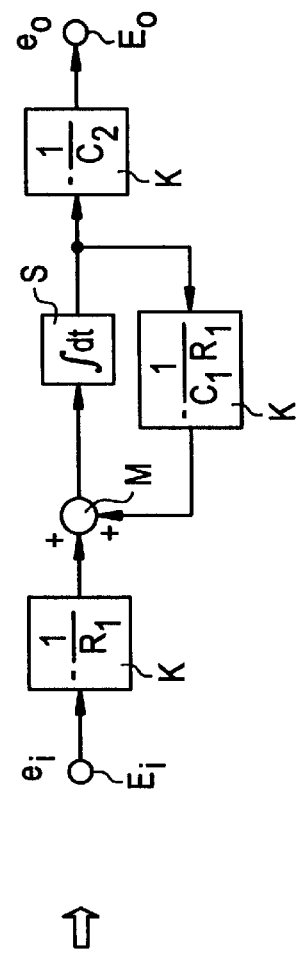
FIG. 4

FIG. 5
The basic analog proportional integration circuit (A3)
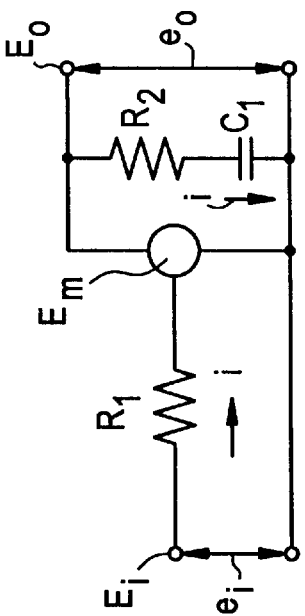
The voltage-current relationships (F3)
$e_i = R_1 i$
$e_0 = -R_2 i - \dfrac{1}{C_1} \int i\, dt$
An equivalent circuit (E3)
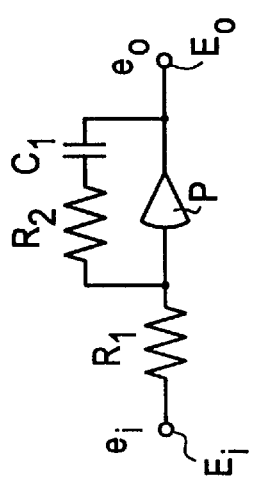
The basic digital proportional integration circuit (D3)
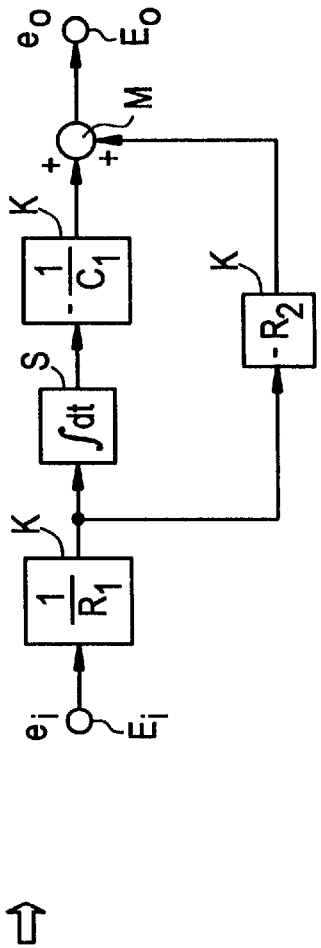

FIG. 6

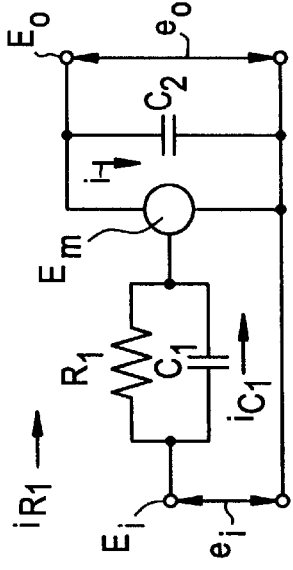

The basic analog proportional integration circuit (A4)

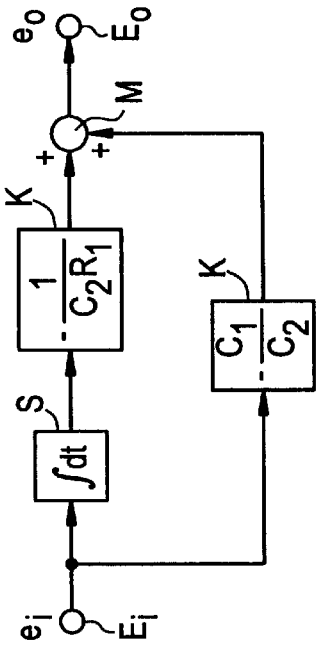

An equivalent circuit (E4)

The basic digital proportional integration circuit (D4)

The voltage-current relationships (F4)

$$i = i_{C_1} + i_{R_1}$$
$$= C_1 \frac{de_i}{dt} + \frac{e_i}{R_1} \quad \cdots \text{①}$$

$$e_o = -\frac{1}{C_2} \int i \, dt \quad \cdots \text{②}$$

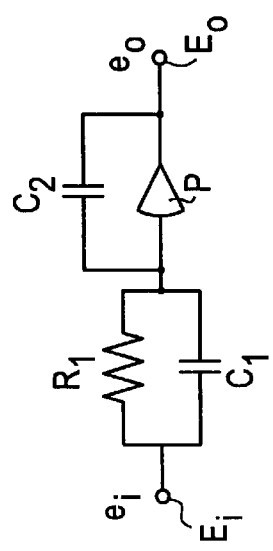

Formula ① is substituted into formula ② producing final result for $e_o$ $$e_o = -\frac{C_1}{C_2} e_i - \frac{1}{C_2 R_1} \int e_i \, dt$$

FIG. 8
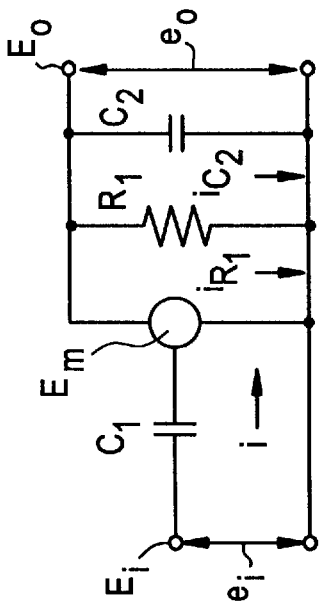
The basic analog approximate differentiation circuit (A6)
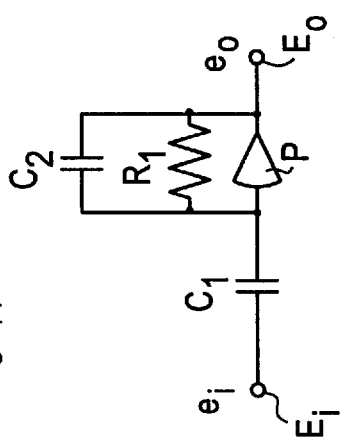
The voltage-current relationships (F6)
$i = i_{C_2} + i_{R_1}$
$C_1 \dfrac{de_i}{dt} = -C_2 \dfrac{de_o}{dt} - \dfrac{e_o}{R_1}$
Both sides are integrated resulting in following formula:
$C_1 e_i = -C_2 e_o - \dfrac{1}{R_1} \int e_o \, dt$
$e_o = -\dfrac{C_1}{C_2} e_i - \dfrac{1}{C_2 R_1} \int e_o \, dt$
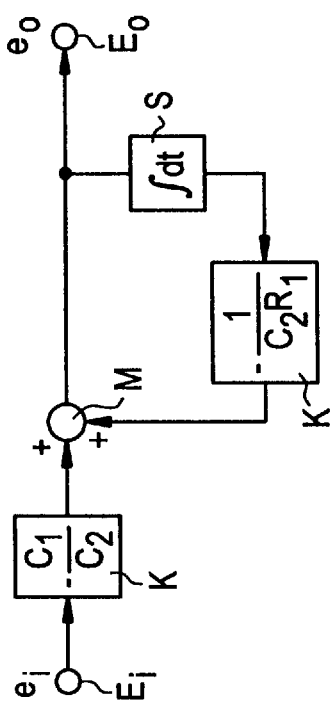
An equivalent circuit (E6)
The basic digital approximate differentiation circuit (D6)

FIG.9
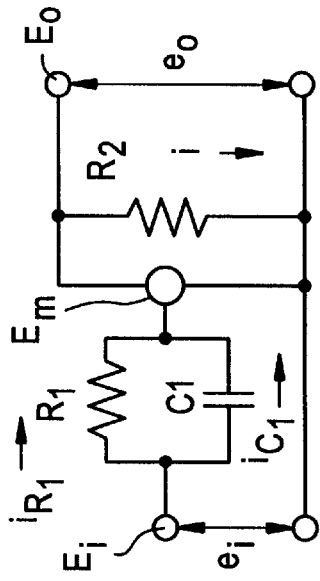
The basic analog proportional differentiation circuit (A7)
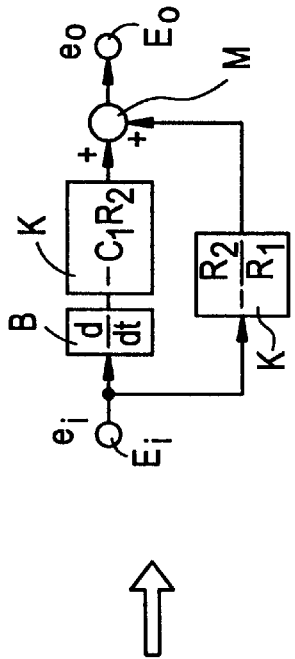
An equivilent circuit (E7)
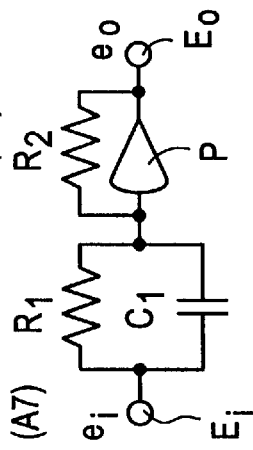
The basic digital proportional differentiation circuit (D7)
The voltage-current relationships (F7)
$i = i_{C_i} + i_{R_1}$
$= C_i \dfrac{de_i}{dt} + \dfrac{e_i}{R_1}$ ... ①
$e_o = -R_2 i$ ... ②
Formula ① is substituted into formula ② producing final result for $e_o$
$e_o = C_1 R_2 \dfrac{de_i}{dt} - \dfrac{R_2}{R_1} e_i$

FIG.10

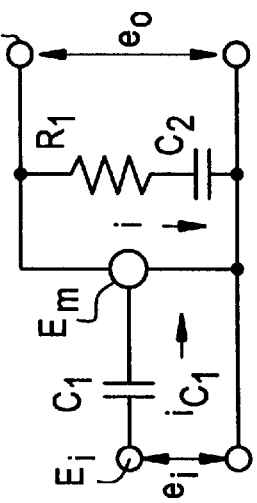

The basic analog proportional differentiation circuit (A8)

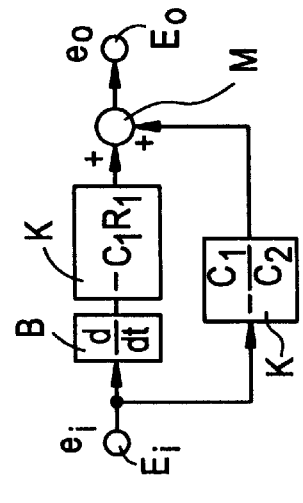

An equivilent circuit (E8)

The basic digital proportional differentiation circuit (D8)

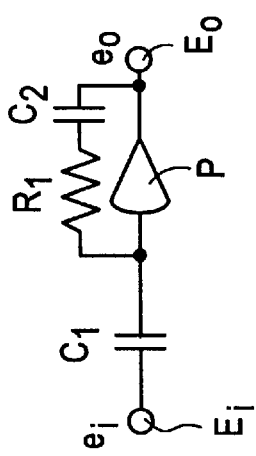

The voltage-current relationships (F8)

$$i = C_1 \frac{de_i}{dt} \quad \cdots \text{①}$$

$$e_o = -R_1 i - \frac{1}{C_2} \int i \, dt \quad \cdots \text{②}$$

Formula ① is substituted into formula ② producing final result for $e_o$ $$e_o = -\frac{C_1}{C_2} e_i - C_1 R_1 \frac{de_i}{dt}$$

FIG. 11
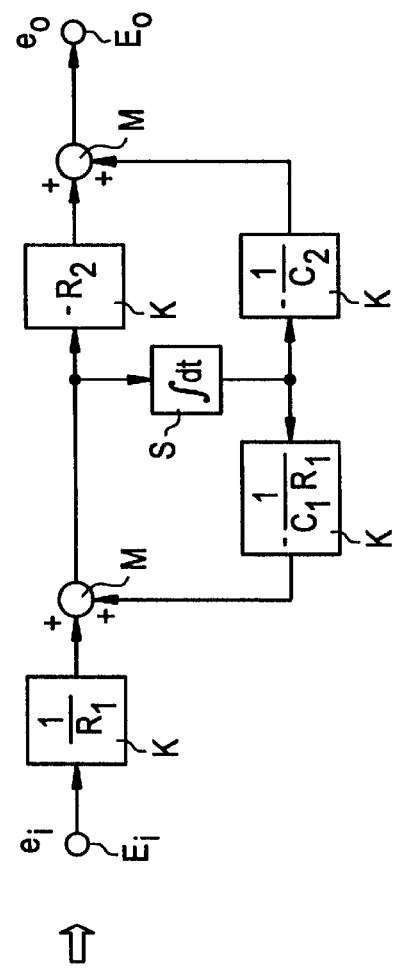
An equivalent circuit (E9)
The basic digital phase compensation circuit (D9)
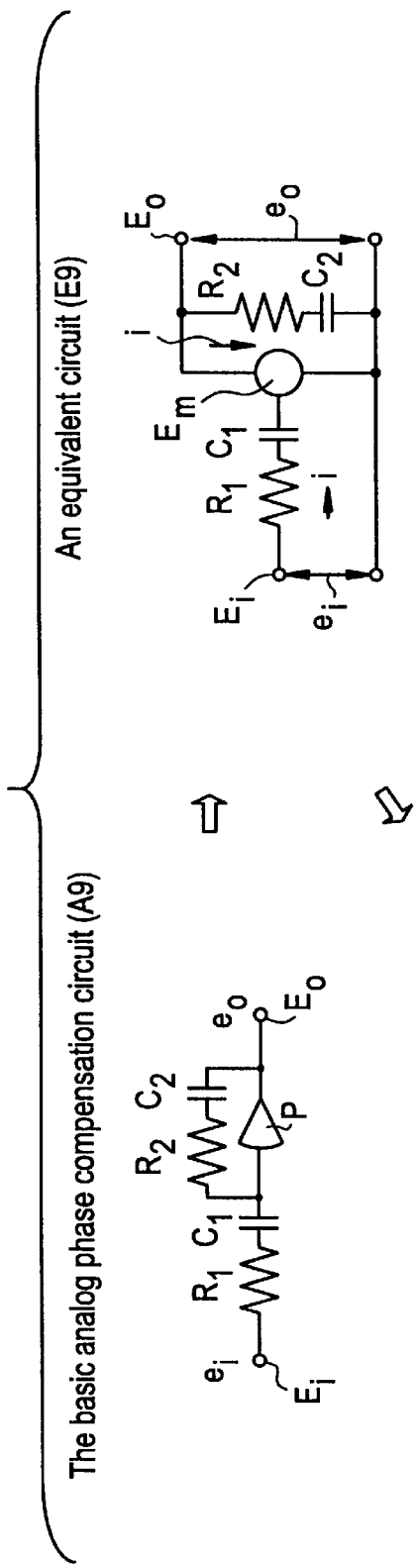
The basic analog phase compensation circuit (A9)
The voltage-current relationships (F9)
$$e_i = R_1 i + \frac{1}{C_1} \int i \, dt \quad \cdots \text{①}$$
Modifying formula ① into following formula:
$$i = \frac{e_i}{R_1} - \frac{1}{C_1 R_1} \int i \, dt$$
$$e_o = -R_2 i - \frac{1}{C_2} \int i \, dt$$

FIG. 13

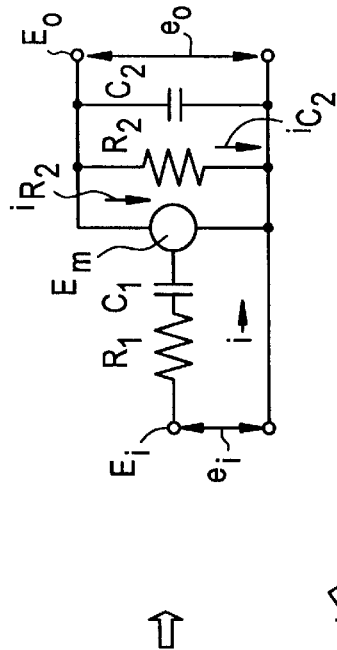

The first basic analog non-oscillation circuit (A11)

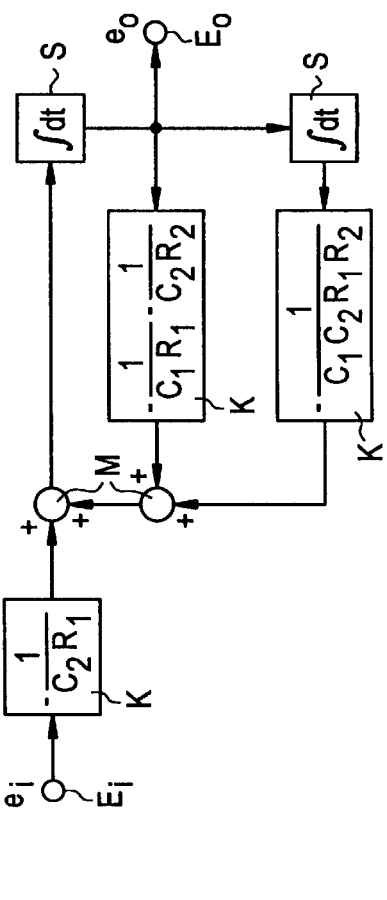

An equivalent circuit (E11)

The first basic digital non-oscillation circuit (D11)

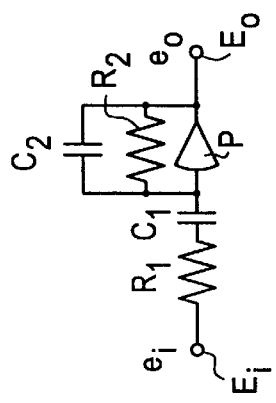

The voltage-current relationships (F11)

$$e_i = R_1 i + \frac{1}{C_1} \int i\, dt \quad \cdots \text{①}$$

$$i = -i_{C_2} = -i_{R_2}$$

$$= -C_2 \frac{de_o}{dt} - \frac{e_o}{R_2} \quad \cdots \text{②}$$

Formula ① is substituted into formula ②
producing final result for $e_o$ $$e_i = -C_2 R_1 \frac{de_o}{dt} - \frac{R_1}{R_2} e_o - \frac{C_2}{C_1} e_o - \frac{1}{C_1 R_2} \int e_o\, dt$$

$$\frac{de_o}{dt} = -\frac{e_i}{C_2 R_1} - \left(\frac{1}{C_1 R_1} + \frac{1}{C_2 R_2}\right) e_o - \frac{1}{C_1 C_2 R_1 R_2} \int e_o\, dt$$

FIG. 14

The second basic analog non-oscillation circuit (A12)

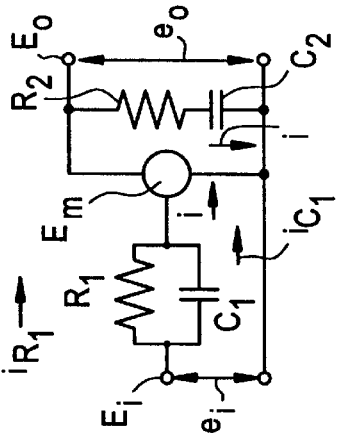

An equivalent circuit (E12)

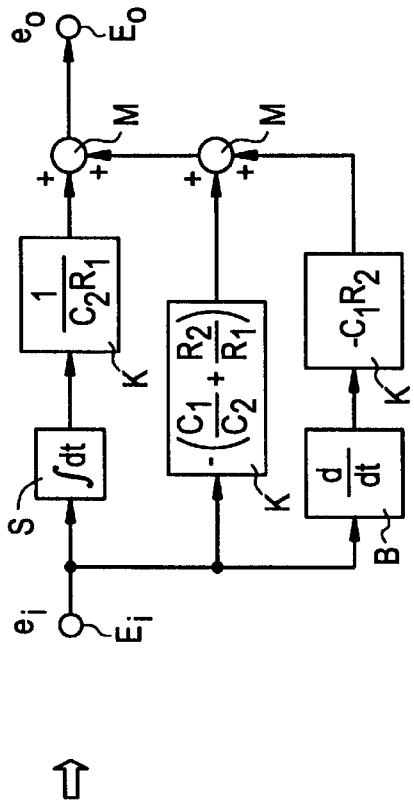

The voltage-current relationships (F12)

$$i = i_{C_1} + i_{R_1} = C_1 \frac{de_i}{dt} + \frac{e_i}{R_1} \quad \cdots \text{①}$$

$$e_o = -R_2 i - \frac{1}{C_2}\int i\,dt \quad \cdots \text{②}$$

Formula ① is substituted into formula ② producing final result for $e_o$ $$e_o = -\frac{1}{C_2 R_1}\int e_i\,dt - \left(\frac{C_1}{C_2} + \frac{R_2}{R_1}\right)e_i - C_1 R_2 \frac{de_i}{dt}$$

The second basic digital non-oscillation circuit (D12)

FIG. 15B
Digital proportional integration circuit (D4)
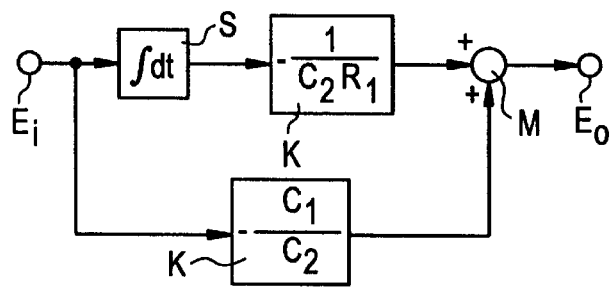
Digital approximate differentiation circuit (D5)
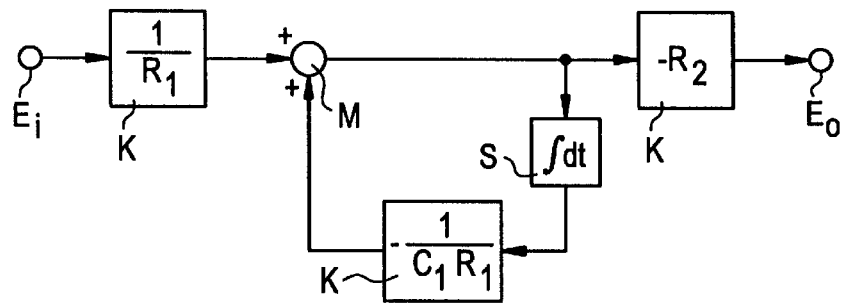
Digital approximate differentiation circuit (D6)
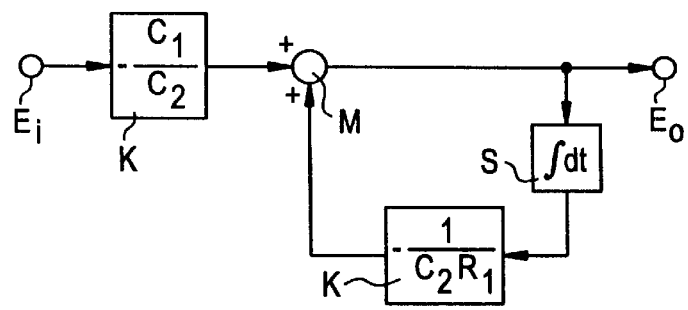

FIG. 15C
Digital proportional differentiation circuit (D7)
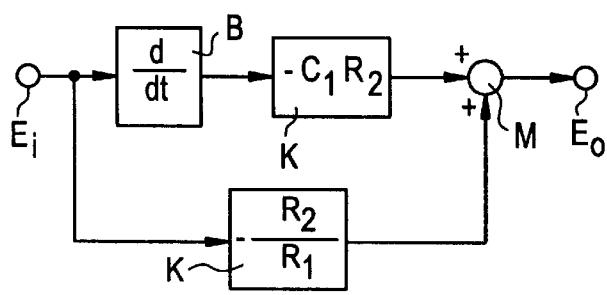
Digital proportional differentiation circuit (D8)
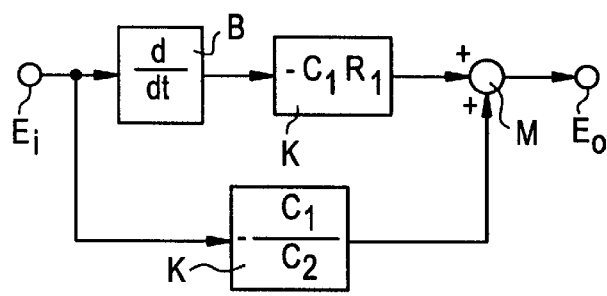
Digital phase compensation circuit (D9)
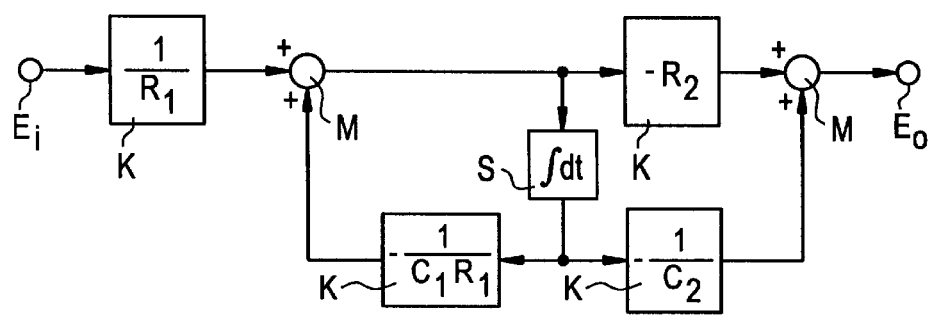

The basic digital arithmetic proportional integration circuit (d3) (d4)

The basic digital arithmetic approximate differentiation circuit (d5) (d6)

PROGRAMMABLE DIGITAL CIRCUITS

FIELD OF THE INVENTION

Circuits that perform arithmetic operations, such as addition, subtraction, multiplication, division, differentiation and integration, can be provided by appropriately combining and connecting an opertaional amplifier (op-amp), resistor(s), and capacitor(s) in different manners. These analog arithmetic circuits may be replaced by digital arithmetic circuits that are equivalent to the respective analog circuits. Each of the digital arithmetic circuits consists principally of adder(s), coefficient unit(s) and integrator(s). By adding a configuration control circuit to the adder(s), coefficient unit(s) and integrator(s), a single, programmable integrated circuit is provided which performs a variety of arithmetic functions depending upon the operation of the configuration control circuit. The present invention relates to such a programmable digital arithmetic integrated circuit, its applications, and a method for producing the programmable digital circuit.

BACKGROUND OF THE INVENTION

Analog arithmetic circuits are capable of performing high-speed arithmetic operations, but have problems in terms of the stability, accuracy, and program portability. Known circuits capable of digital computing include microprocessors, digital signal processors (DSP), and digital differential analyzers (DDA), all of which are programmable. The microprocessors and DSP, however, are of serial processing type based on von Neumann computers, in which software or programs intervene in the process of arithmetic operations, thus putting a limit to the operation speed. DDA is also of serial processing type, and there is a limit to the operation speed. Digital circuits according to the present invention as described below are programmable only in terms of function setting, and the process of arithmetic operations does not involve serial processing according to software or programs, thus enabling the circuits to achieve high-speed arithmetic operations.

SUMMARY OF THE INVENTION

It is therefore an object of the present invention to convert various analog arithmetic circuits that have been widely used into corresponding digital circuits, and provide a generic digital arithmetic integrated circuit that can be generally used to provide each of the digital circuits to perform a selected one of arithmetic operations. It is also an object of the invention to provide an expanded digital network formed by connecting a plurality of the generic digital arithmetic integrated circuits to each other, which network assures increased accuracy and speed in performing arithmetic operations, and is advantageous in that the circuits are more effectively used for general purposes.

According to one aspect of the present invention for accomplishing the above object, a composite digital network that includes at least one integrating circuit, at least one summing circuit and at least one coefficient circuit is formed as a fixed integrated circuit, and at least one coefficient of the above-indicated at least one coefficient circuit is changed so that the composite digital network provides a selected one of digital arithmetic circuits having different arithmetic or computing functions. This composite digital network may be formed as a circuit unit, and a plurality of circuit units may be arranged and connected to each other in a certain direction or directions, such as rows, columns, or layers, to thus provide an expanded network.

According to another aspect of the present invention, a generic digital arithmetic integrated circuit is produced by converting a plurality of types of basic analog arithmetic circuits having different computing functions into respective equivalent analog circuits, obtaining expressions representing current-voltage relationships on input and output sides of each equivalent analog circuit, defining a plurality of basic digital arithmetic circuits that respectively correspond to the basic analog arithmetic circuits, each of the basic digital arithmetic circuits being designed by locating digital arithmetic elements according to the expressions of the above current-voltage relationships, and connecting the plurality of basic digital arithmetic circuits via at least one coefficient circuit each having an ON/OFF function.

In one basic form of the invention, a generic digital arithmetic integrated circuit is provided which comprises a composite digital network that includes at least one integrating circuit, at least one summing circuit and at least one coefficient circuit and is formed as a fixed integrated circuit, wherein at least one coefficient of the coefficient circuit(s) is changed so that the composite digital network provides a selected one of digital arithmetic circuits having different computing functions.

In another basic form of the present invention, a generic digital arithmetic integrated circuit is provided which comprises a plurality of circuit units each comprising a composite digital network that includes at least one integrating circuit, at least one summing circuit and at least one coefficient circuit, wherein at least one coefficient of the coefficient circuit(s) is changed so that the composite digital network provides a selected one of digital arithmetic circuits having different computing functions, and wherein the circuit units are arranged and connected to each other in at least one direction of rows, columns and layers, to provide an expanded network, so that the circuit units are formed as a fixed integrated circuit.

In a further basic form of the invention, a generic digital arithmetic integrated circuit is provided which comprises a composite digital network that includes at least one integrating circuit, at least one summing circuit and at least one coefficient circuit and is formed as a fixed integrated circuit, wherein at least one coefficient of the coefficient circuit(s) is changed so that the composite digital network selectively provides at least one of two or more basic digital arithmetic circuits, out of a plurality of types of basic digital arithmetic circuits having different computing functions.

In a still another basic form of the invention, a generic digital arithmetic integrated circuit is provided which comprises a plurality of circuit units each comprising a composite digital network that includes at least one integrating circuit, at least one summing circuit and at least one coefficient circuit, wherein at least one coefficient of the coefficient circuit(s) is changed so that the composite digital network selectively provides at least one of two or more basic digital arithmetic circuits, out of a plurality of types of basic digital arithmetic circuits having different computing functions, and wherein the plurality of circuit units are arranged and connected to each other in at least one direction of rows, columns and layers, to provide an expanded network, so that the circuit units are formed as a fixed integrated circuit.

In one preferred form of the present invention, a generic digital arithmetic integrated circuit is provided which comprises a composite digital network that is formed as a fixed integrated circuit wherein a coefficient circuit ($K_{22}$), a summing circuit ($M_{13}$), a coefficient circuit ($K_{23}$), a summing circuit ($M_{14}$) and a summing circuit ($M_{15}$) are connected in series, and an integrating circuit ($S_{10}$), a coefficient circuit ($K_{24}$) and a summing circuit ($M_{16}$) are connected in series between an output terminal and the other input terminal of the summing circuit ($M_{13}$), wherein an integrating circuit ($S_{10}$) and a coefficient circuit ($K_{25}$) are connected in series between the output terminal of the summing circuit ($M_{13}$) and the other input terminal of the summing circuit ($M_{14}$), and an integrating circuit ($S_{11}$) and a coefficient circuit ($K_{26}$) are connected in series between an output terminal of the coefficient circuit ($K_{25}$) and the other input terminal of the summing circuit ($M_{16}$), and wherein a coefficient circuit ($K_{27}$), a summing circuit ($M_{17}$) and a coefficient circuit ($K_{28}$) are connected in series between the output terminal of the summing circuit ($M_{13}$) and the other input terminal of the summing circuit ($M_{15}$), and an integrating circuit ($S_{12}$) and a coefficient circuit ($K_{29}$) are connected in series between an output terminal and the other input terminal of the summing circuit ($M_{17}$). At least one coefficient of the coefficient circuits is changed so that the composite digital network provides a selected one of a basic digital arithmetic first-order lag integration circuit, a basic digital arithmetic proportional integration circuit, a basic digital arithmetic approximate differentiation circuit, a basic digital arithmetic proportional differentiation circuit, a basic digital arithmetic phase compensation circuit, a first basic digital arithmetic non-oscillation circuit, and a second basic digital arithmetic non-oscillation circuit.

In another preferred form of the invention, a generic digital arithmetic integrated circuit is provided which comprises a plurality of circuit units each of which comprises a composite digital network wherein a coefficient circuit ($K_{22}$), a summing circuit ($M_{13}$), a coefficient circuit ($K_{23}$), a summing circuit ($M_{14}$) and a summing circuit ($M_{15}$) are connected in series, and an integrating circuit ($S_{10}$), a coefficient circuit ($K_{24}$) and a summing circuit ($M_{16}$) are connected in series between the output terminal and the other input terminal of the summing circuit ($M_{13}$), wherein an integrating circuit ($S_{10}$) and a coefficient circuit ($K_{15}$) are connected in series between an output terminal of the summing circuit ($M_{13}$) and the ether input terminal of the summing circuit ($M_{14}$), and an integrating circuit ($S_{11}$) and a coefficient circuit ($K_{26}$) are connected in series between an output terminal of the coefficient circuit ($K_{25}$) and the other input terminal of the summing circuit ($M_{16}$), and wherein a coefficient circuit ($K_{27}$), a summing circuit ($M_{17}$) and a coefficient circuit ($K_{28}$) are connected in series between the output terminal of the summing circuit ($M_{13}$) and the other input terminal of the summing circuit ($M_{15}$), and an integrating circuit ($S_{12}$) and a coefficient circuit ($K_{29}$) are connected in series between an output terminal and the other input terminal of the summing circuit ($M_{17}$). At least one coefficient of the coefficient circuits is changed so that the composite digital network provides a selected one of a basic digital arithmetic first-order lag integration circuit, a basic digital arithmetic proportional integration circuit, a basic digital arithmetic approximate differentiation circuit, a basic digital arithmetic proportional differentiation circuit, a basic digital arithmetic phase compensation circuit, a first basic digital arithmetic non-oscillation circuit, and a second basic digital arithmetic non-oscillation circuit, and the plurality of circuit units are arranged and connected to each other in at least one direction of rows, columns and layers, to provide an expanded network, so that the circuit units are formed as a fixed integrated circuit.

In a further preferred form of the present invention, a generic digital arithmetic integrated circuit is provided which comprises a composite digital network that is formed as a fixed integrated circuit wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of the summing circuit ($M_{18}$), and wherein the integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of the coefficient circuit ($K_{30}$) and the other input terminal of the summing circuit ($M_{20}$). At least one coefficient of the coefficient circuits is changed so that the composite digital network provides a selected one of a basic digital arithmetic first-order lag integration circuit, a basic digital arithmetic proportional integration circuit, a basic digital arithmetic approximate differentiation circuit, a basic digital arithmetic proportional differentiation circuit, and a basic digital arithmetic phase compensation circuit.

In a still another preferred form of the invention, a generic digital arithmetic integrated circuit is provided which comprises a plurality of circuit units each of which comprises a composite digital network wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of the summing circuit ($M_{18}$), wherein the integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of the coefficient circuit ($K_{30}$) and the other input terminal of the summing circuit ($M_{20}$), and wherein at least one coefficient of the coefficient circuits is changed so that the composite digital network provides a selected one of a basic digital arithmetic first-order lag integration circuit, a basic digital arithmetic proportional integration circuit, a basic digital arithmetic approximate differentiation circuit, a basic digital arithmetic proportional differentiation circuit, and a basic digital arithmetic phase compensation circuit. The plurality of circuit units are arranged and connected to each other in at least one direction of rows, columns and layers, to provide an expanded network, so that the circuit units are formed as a fixed integrated circuit.

In another preferred form of the invention, a generic digital arithmetic integrated circuit is provided that comprises first and second composite digital networks (Ws1) (Ws2) having the same circuit pattern wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of the summing circuit ($M_{18}$), and wherein the integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of the coefficient circuit ($K_{30}$) and the other input terminal of the summing circuit ($M_{20}$). An output terminal of the summing circuit ($M_{20}$) of the first composite digital network (Ws1) is connected to the input terminal of the coefficient circuit ($K_{30}$) of the second composite digital network (Ws2), and an output terminal of the summing circuit ($M_{20}$) of the second composite digital network (Ws2) is connected to the other input terminal of the summing circuit ($M_{18}$) of the first composite digital network (Ws1), so that the first and second composite digital networks (Ws1) (Ws2) are formed as a fixed integrated circuit that provides a first basic digital arithmetic non-oscillation circuit by setting a coefficient of each of the coefficient circuits in the first and second composite digital networks (Ws1) (Ws2).

In another preferred form of the present invention, a generic digital arithmetic integrated circuit is provided which comprises first and second composite digital networks (Ws1) (Ws2) having the same circuit pattern wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of the summing circuit ($M_{18}$), and wherein the integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of the coefficient circuit ($K_{30}$) and the other input terminal of the summing circuit ($M_{20}$). An output terminal of the summing circuit ($M_{20}$) of the first composite digital network (Ws1) is connected to the other input terminal of the summing circuit ($M_{20}$) of the second composite digital network (Ws2), and the input terminal of said coefficient circuit ($K_{30}$) of the first composite digital network is connected to the input terminal of the coefficient circuit ($K_{30}$) of the second composite digital network (Ws2), so that the first and second composite digital networks (Ws1) (Ws2) are formed as a fixed integrated circuit that provides a second basic digital arithmetic non-oscillation circuit by setting a coefficient of each of the coefficient circuits in the first and second composite digital networks (Ws1) (Ws2).

In a preferred form of the second aspect of the invention, a method of producing the generic digital arithmetic integrated circuit as described above is provided wherein a plurality of types of basic analog arithmetic circuits having different computing functions are converted into respective equivalent analog circuits, an expression representing a current-voltage relationship on the input side of each equivalent analog circuit and an expression representing a current-voltage relationship on the output side of each equivalent circuit are obtained based on Kirchhoff's rules, a plurality of basic digital arithmetic circuits that respectively correspond to the basic analog arithmetic circuits are defined such that each of the basic digital arithmetic circuits is designed by locating digital arithmetic elements according to the expressions of the current-voltage relationships, and the plurality of basic digital arithmetic circuits are connected via at least one coefficient circuit each having an ON/OFF switching function.

BRIEF DESCRIPTION OF THE DRAWINGS

The invention will be described in greater detail with reference to preferred embodiments thereof and the accompanying drawings, wherein:

FIG. 1 is a list of diagrams of various types of basic analog arithmetic circuits which have been widely used in the prior art;

FIG. 3 is a view explaining conversion of a first-lag integration circuit as one of the basic analog arithmetic circuits into a basic digital arithmetic first-lag integration circuit that provides a basis of the present invention;

FIG. 4 is a view explaining conversion of another first-lag integration circuit as one of the basic analog arithmetic circuits into a basic digital arithmetic first-lag integration circuit that provides a basis of the present invention;

FIG. 5 is a view explaining conversion of a proportional integration circuit as one of the basic analog arithmetic circuits into a basic digital arithmetic proportional integration circuit that provides a basis of the present invention;

FIG. 6 is a view explaining conversion of another proportional integration circuit as one of the basic analog arithmetic circuits into a basic digital arithmetic proportional integration circuit that provides a basis of the present invention;

FIG. 8 is a view explaining conversion of another approximate differentiation circuit as one of the basic analog arithmetic circuits into a basic digital arithmetic approximate differentiation circuit that provides a basis of the present invention;

FIG. 9 is a view explaining conversion of a proportional differentiation circuit as one of the basic analog arithmetic circuits into a basic digital arithmetic proportional differentiation circuit that provides a basis of the present invention;

FIG. 10 is a view explaining conversion of another proportional differentiation circuit as one of the basic analog arithmetic circuits into a basic digital arithmetic proportional differentiation circuit that provides a basis of the present invention;

FIG. 11 is a view explaining conversion of a phase compensation circuit as one of the basic analog arithmetic circuits into a basic digital arithmetic phase compensation circuit that provides a basis of the present invention;

FIG. 13 is a view explaining conversion of a first non-oscillation circuit as one of the basic analog arithmetic circuits into a first basic digital arithmetic non-oscillation circuit that provides a basis of the present invention;

FIG. 14 is a view explaining conversion of a second non-oscillation circuit as one of the basic analog arithmetic circuits into a second basic digital arithmetic non-oscillation circuit that provides a basis of the present invention;

DETAILED DESCRIPTION OF THE PREFERRED EMBODIMENT(S)

Figure 2:
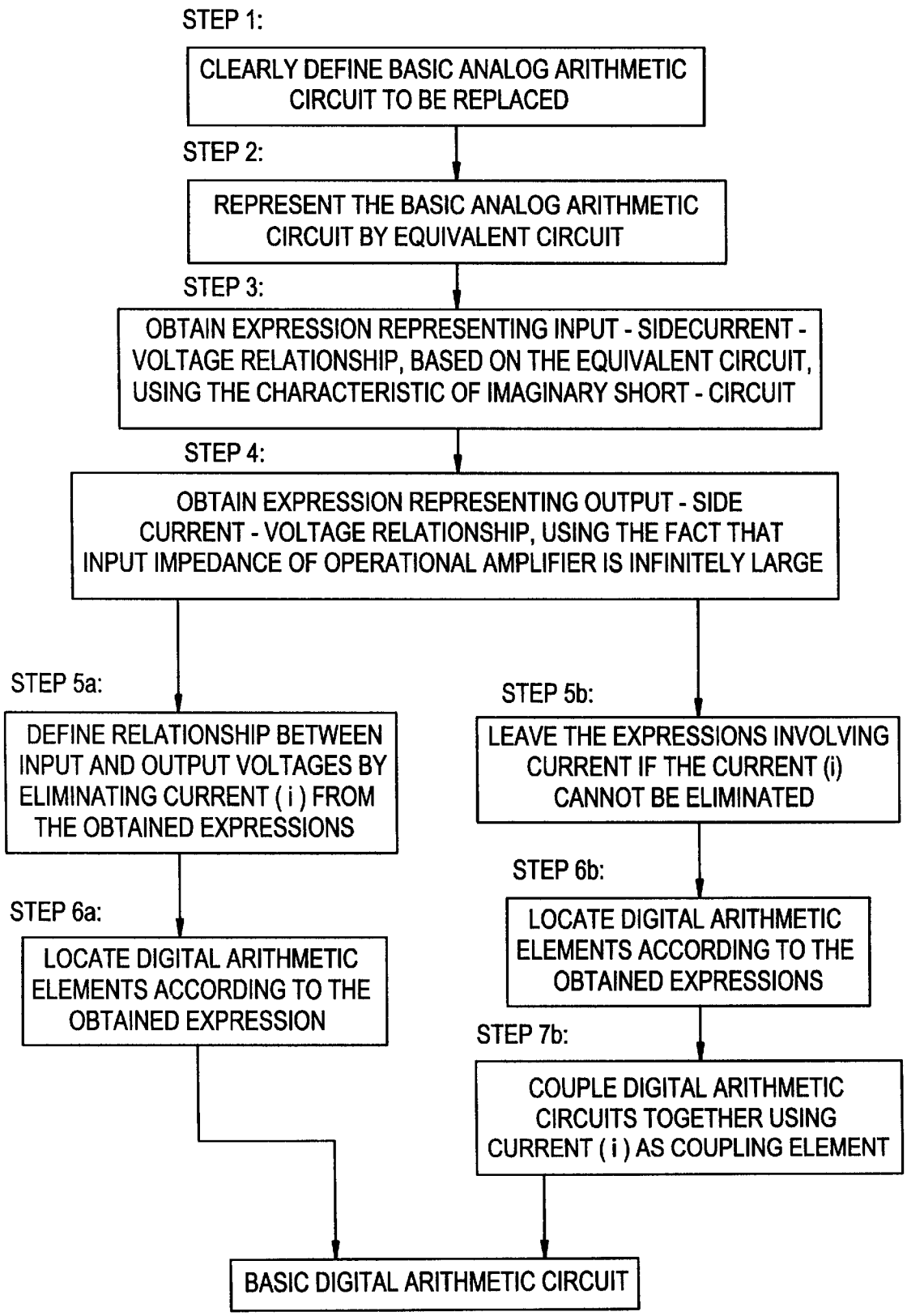
FIG. 2 is a flowchart explaining the procedure of converting various types of basic analog arithmetic circuits into basic digital arithmetic circuits that provide a basis of the present invention.

One preferred embodiment of the present invention in the form of a generic digital arithmetic integrated circuit used for a multifunction simulator will be described in detail, referring to the drawings. Conventionally, twelve types of basic analog arithmetic circuits as shown in FIG. 1 have been generally used for various kinds of simulators, such as an automatic control simulator, flight simulator, nuclear reactor simulator, vibration simulator for multistoried buildings, pipe line simulator, elevator simulator, flood simulator, simulator for use in medical applications, and a simulator used for training in operating power plants. More specifically, the basic analog arithmetic circuits consist of basic analog arithmetic first-order lag integration circuits (A1), (A2), basic analog arithmetic proportional integration circuits (A3), (A4), basic analog arithmetic approximate differentiation circuits (A5), (A6), basic analog arithmetic proportional differentiation circuits (A7), (A8), basic analog arithmetic phase compensation circuits (A9), (A10), first basic analog arithmetic non-oscillation circuit (A11), and second basic analog arithmetic non-oscillation circuit (A12). These basic arithmetic circuits include differentiating elements and integrating elements. In FIG. 1. "$R_1$", "$R_2$" denote resistors and their resistance values, "$C_1$", "$C_2$" denote capacitors and their capacitance values, "P" denotes an operational amplifier or op-amp, "$E_i$" denotes input terminal, "$E_0$" denotes output terminal, "$e_i$" denotes input voltage, and "$e_0$" denotes output voltage.

According to the procedure as indicated in FIG. 2, the above twelve types of basic analog arithmetic circuits are respectively replaced by corresponding basic digital arithmetic circuits. Initially, the basic analog arithmetic circuits to be replaced, namely, the above-indicated analog first-order lag integration circuits (A1), (A2), analog proportional integration circuits (A3), (A4), analog approximate differentiation circuits (AS), (A6), analog proportional differentiation circuits (A7), (A8), analog phase compensation circuits (A9), (A10), first analog non-oscillation circuit (A11), and second analog non-oscillation circuit (A12), are clearly specified in step 1, and represented by respective equivalent circuits in step 2. In the following step 3, the current-voltage relationship on the input side of each basic analog arithmetic circuit is represented by an expression, utilizing the characteristic of an imaginary short-circuit (the potential difference between input terminals must be zero to provide a finite value of output voltage in a circuit including feedback, and if the positive terminal is grounded, the potential of the negative terminal becomes equal to that of the positive terminal). In step 4, the current-voltage relationship on the output side of each basic analog arithmetic circuit is represented by an expression, utilizing the fact that the input impedance of the operational amplifier is infinitely large.

In the next step 5a, the relationship between input and output voltages is defined or specified by eliminating the current (i) from the expression obtained in step 4, and digital arithmetic elements are arranged in step 6a in accordance with the relationship obtained in step 5a. If the current (i) cannot be eliminated from the expression obtained in step 4, on the other hand, the current-voltage relationships are represented by expressions involving the current "i" in step 5b, and digital arithmetic elements are arranged in step 6b in accordance with each of the expressions obtained in step 5b. In step 7b, digital arithmetic circuits formed in step 6b are coupled together using the current (i) as a coupling element. In this manner, step 4 is followed by steps 5a and 6a, or steps 5b, 6b and 7b, so that the twelve types of basic analog arithmetic circuits, namely, first-order lag integration circuits (A1), (A2), proportional integration circuits (A3), (A4), approximate differentiation circuits (A5), (A6), proportional differentiation circuits (A7), (A8), phase compensation circuits (A9), (A10), first non-oscillation circuit (A11), and second non-oscillation circuit (A12), are replaced by corresponding basic digital arithmetic circuits, namely, basic digital arithmetic first-order lag integration circuits (D1) (D2), basic digital arithmetic proportional integration circuits (D3) (D4), basic digital arithmetic approximate differentiation circuits (D5) (D6), basic digital arithmetic proportional differentiation circuits (D7) (D8), basic digital arithmetic phase compensation circuits (D9), (D10), first basic digital arithmetic non-oscillation circuit (D11), and second basic digital arithmetic non-oscillation circuit (D12).

Referring to FIG. 3 through FIG. 14, the process of replacing the basic analog arithmetic circuits by the corresponding basic digital arithmetic circuits will be described in greater detail. In FIG. 3–14, "Em" denotes current source, "S" denotes integrating circuit, "B" denotes differentiating circuit, "M" denotes summing circuits, and "K" denotes coefficient circuit.

FIG. 3 shows the process of replacing the basic analog first-order lag integration circuit (A1) by the basic digital first-order lag integration circuit (D1). Initially, an equivalent circuit (E1) is formed based on the analog first-order lag integration circuit (A1). Then, a set of expressions (F1) representing the current-voltage relationships in the equivalent circuit (E1) are obtained based on Kirchhoff's rules, in view of the flow of the current in the analog equivalent circuit, and then digital arithmetic elements are arranged according to the thus obtained expressions, to provide the digital first-order lag integration circuit (D1).

FIG. 4 shows the process of replacing the basic analog first-order lag integration circuit (A2) by the basic digital first-order lag integration circuit (D2) in a similar manner. Initially, an equivalent circuit (E2) is formed based on the analog first-order lag integration circuit (A2), and a set of expressions (F2) representing the voltage-current relationships in the equivalent circuit (E2) are obtained. Then, digital arithmetic elements are arranged according to the obtained expressions, to provide the digital first-order lag integration circuit (D2).

FIG. 5 shows the process of replacing the basic analog proportional integration circuit (A3) by the basic digital proportional integration circuit (D3), using an equivalent circuit (E3) of the analog circuit (A3) and a set of expressions (F3) representing the voltage-current relationships in the equivalent circuit (E3). FIG. 6 shows the process of replacing the basic analog proportional integration circuit (A4) by the basic digital proportional integration circuit (D4), using an equivalent circuit (E4) of the analog circuit (A4) and a set of expressions (F4) representing the voltage-current relationships in the equivalent circuit (E4).

Figure 7:
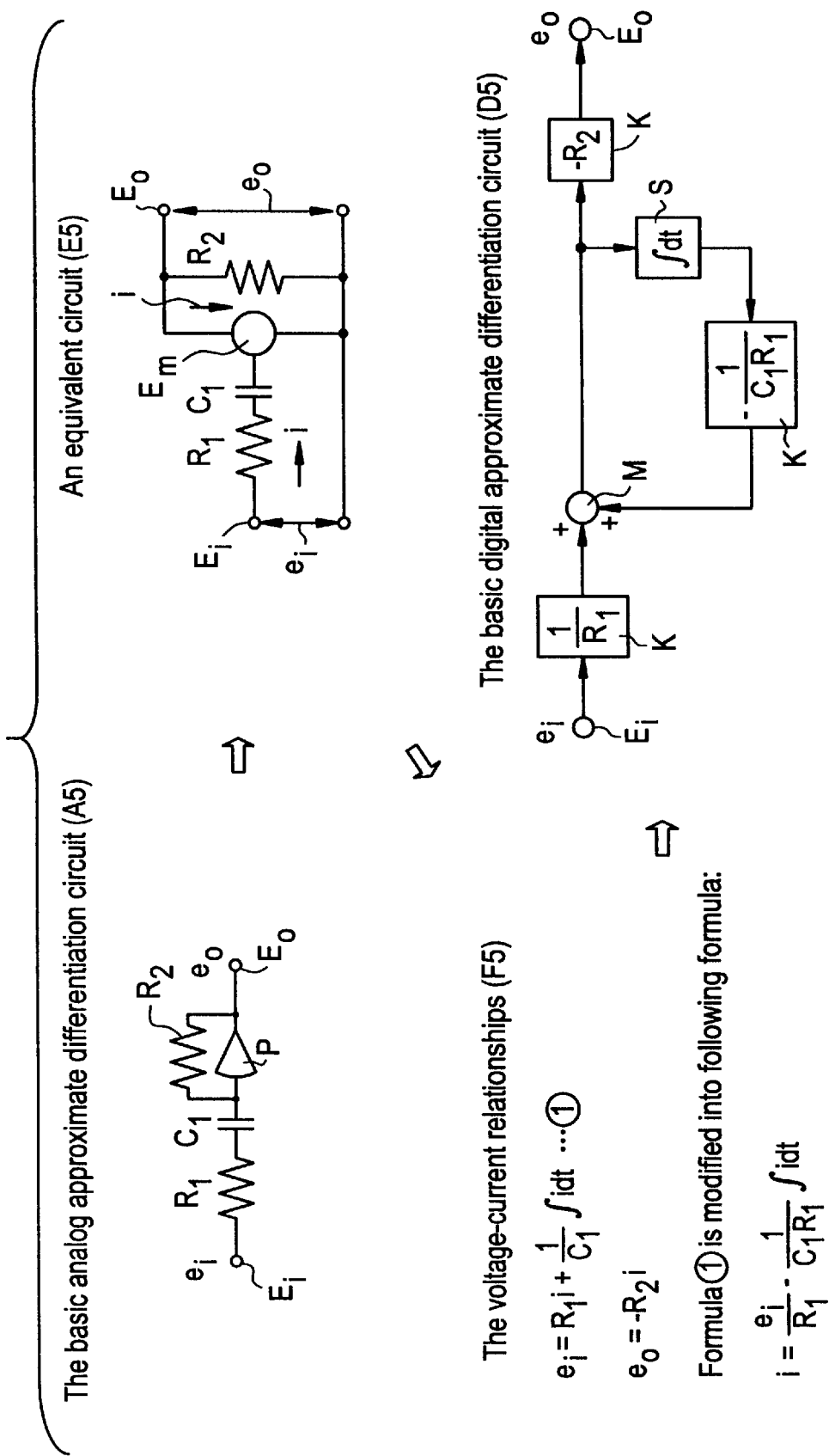
FIG. 7 is a view explaining conversion of an approximate differentiation circuit as one of the basic analog arithmetic circuits into a basic digital arithmetic approximate differentiation circuit that provides a basis of the present invention.

FIG. 7 shows the process of replacing the basic analog approximate differentiation circuit (A5) by the basic digital approximate differentiation circuit (D5), using an equivalent circuit (E5) of the analog circuit (A5) and a set of expressions (F5) representing the current-voltage relationships in the equivalent circuit (E5). FIG. 8 shows the process of replacing the basic analog approximate differentiation circuit (A6) by the basic digital approximate differentiation circuit (D6), using an equivalent circuit (E6) of the analog circuit (A6) and a set of expressions (F6) representing the voltage-current relationships in the equivalent circuit (E6).

FIG. 9 shows the process of replacing the basic analog proportional differentiation circuit (A7) by the basic digital proportional differentiation circuit (D7), using an equivalent circuit (E7) of the analog circuit (A7) and a set of expressions (F7) representing the voltage-current relationships in the equivalent circuit (E7). FIG. 10 shows the process of replacing the basic analog proportional differentiation circuit (A8) by the basic digital proportional differentiation circuit (D8), using an equivalent circuit (E8) of the analog circuit (A8) and a set of expressions (F8) representing the voltage-current relationships in the equivalent circuit (E8).

Figure 12:
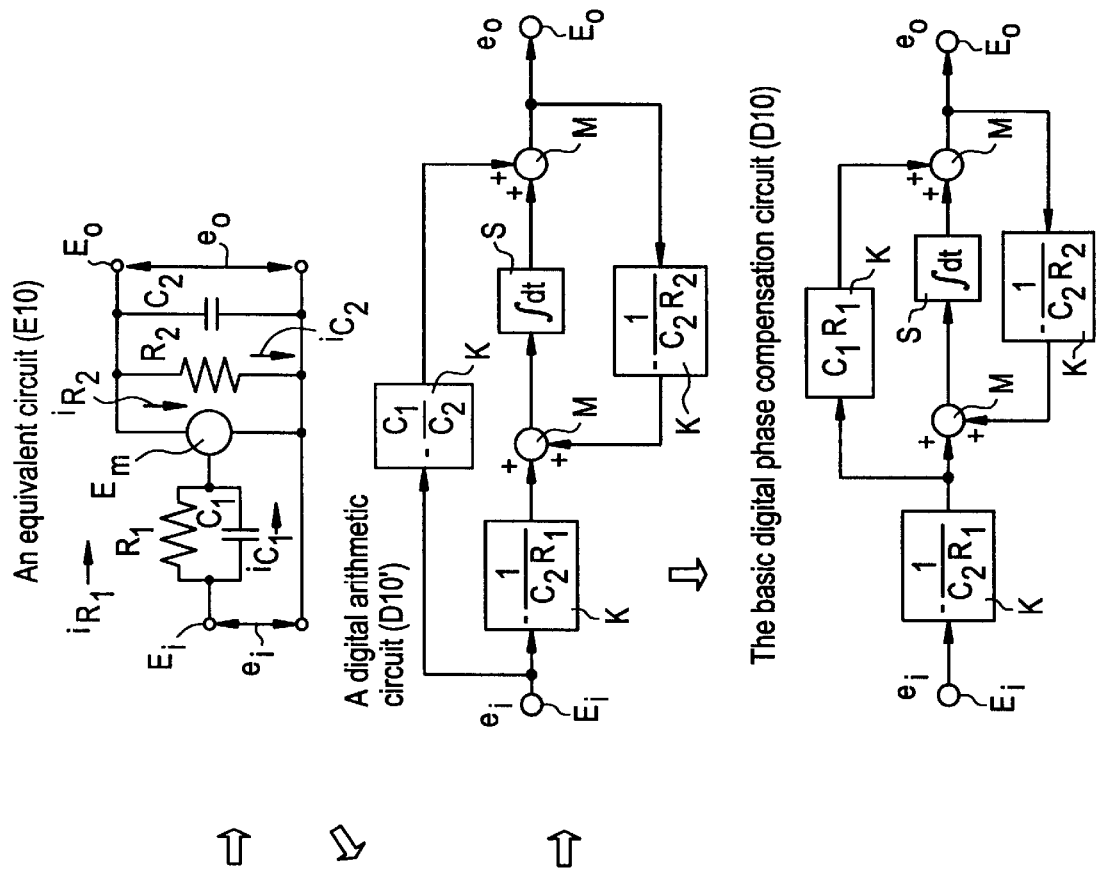
FIG. 12 is a view explaining conversion of another phase compensation circuit as one of the basic analog arithmetic circuits into a basic digital arithmetic phase compensation circuit that provides a basis of the present invention.

FIG. 11 shows the process of replacing the basic analog phase compensation circuit (A9) by the basic digital phase compensation circuit (D9), using an equivalent circuit (E9) of the analog circuit (A9) and a set of expressions (F9) representing the voltage-current relationships in the equivalent circuit (E9). FIG. 12 shows the process of replacing the basic analog phase compensation circuit (A10) by the basic digital phase compensation circuit (D10), using an equivalent circuit (E10) of the analog circuit (A10), a set of expressions (F10) representing the voltage-current relationships in the equivalent circuit (E10), and a digital arithmetic circuit (D10').

FIG. 13 shows the process of replacing the first basic analog non-oscillation circuit (A11) by the first basic digital non-oscillation circuit (D11), using an equivalent circuit (E11) of the analog circuit (A11) and a set of expressions (F11) representing the voltage-current relationship in the equivalent circuit (E11). FIG. 14 shows the process of replacing the second basic analog non-oscillation circuit (A12) by the second basic digital non-oscillation circuit (D12), using an equivalent circuit (E12) of the analog circuit (A12) and a set of expressions (F12) representing the voltage-current relationships in the equivalent circuit (E12).

Figure 15A:
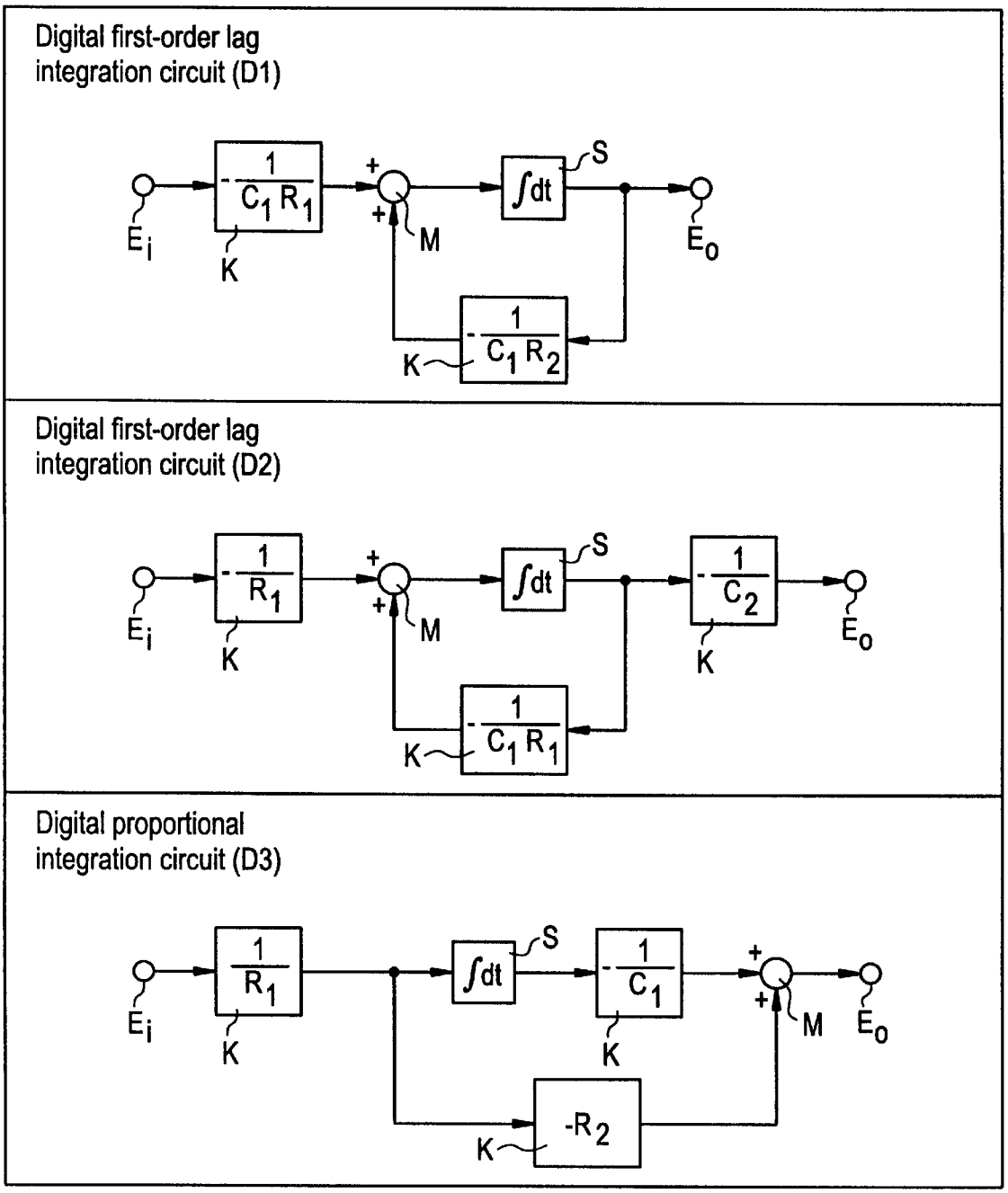
FIG. 15 is a list of circuit diagrams of basic digital arithmetic circuits which correspond to the various types of basic analog arithmetic circuits and on which the present invention is based.
Figure 15D:
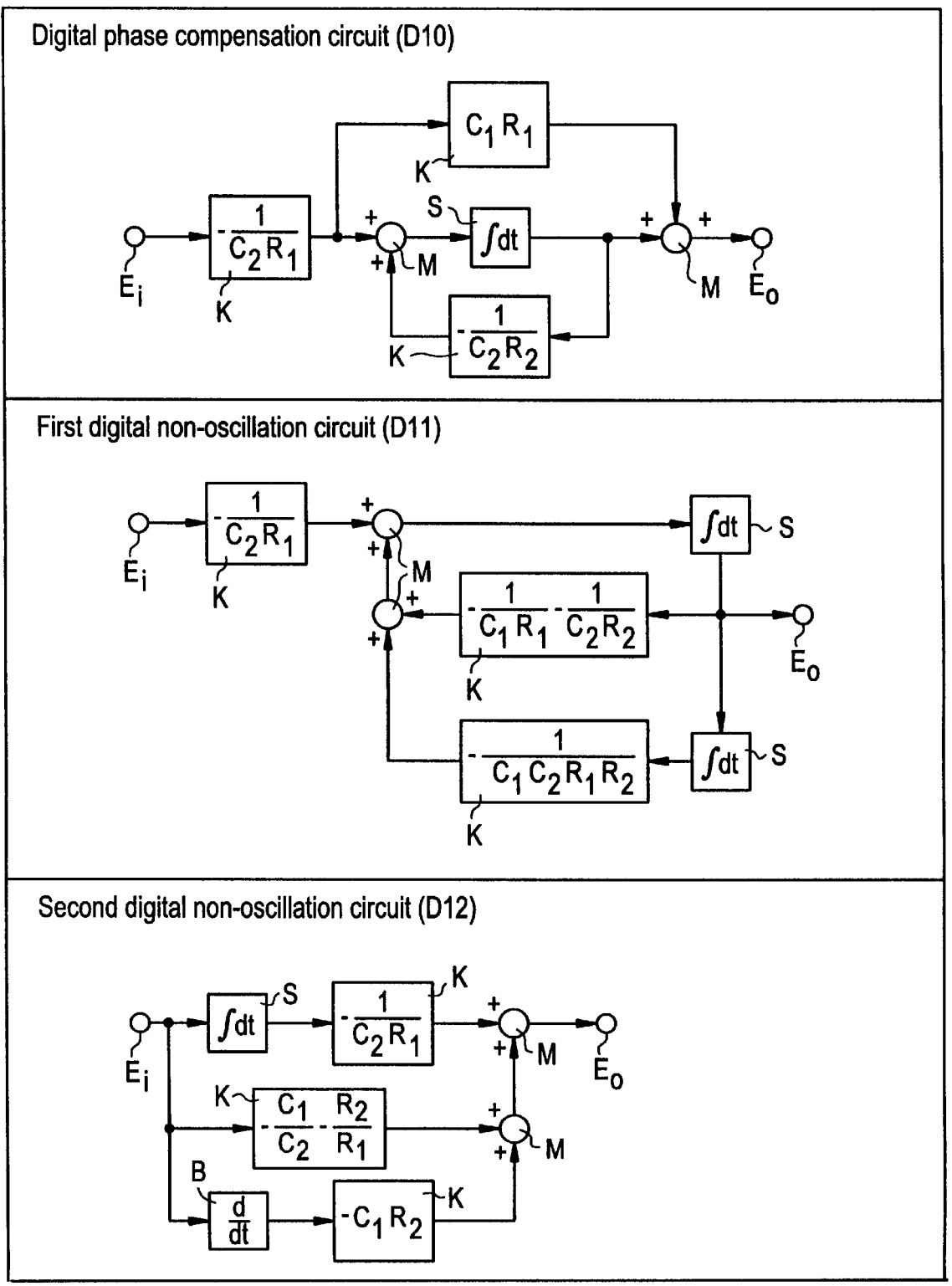
Figure 16:
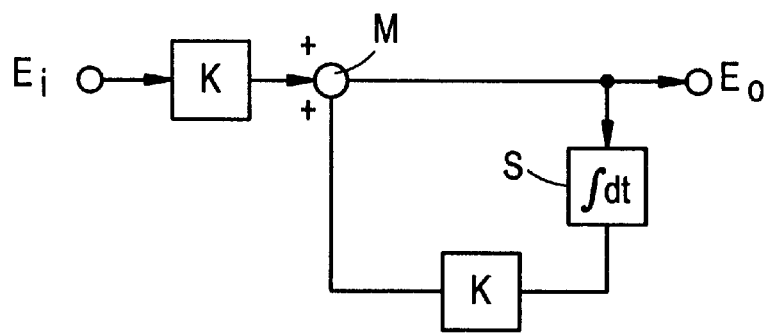
FIG. 16 is a circuit diagram of a digital approximate differentiation circuit used in the present invention.

FIG. 15 shows a list of the basic digital arithmetic circuits obtained by the processes as described above, namely, the digital first-lag integration circuits (D1) (D2), digital proportional integration circuits (D3) (D4), digital approximate differentiation circuits (D5) (D6), digital proportional differentiation circuits (D7) (D8), digital phase compensation circuits (D9) (D10), first digital non-oscillation circuit (D11) and second digital non-oscillation circuit (D12). Among these digital circuits, each of the proportional differentiation circuits (D7) (D8) and second non-oscillation circuit (D12) requires the use of a differentiating circuit (B). Since even an analog circuit cannot perform ideal differentiation, the basic analog approximate differentiation circuit (A5) is used as a substitute for performing approximate differentiation. Similarly, the basic digital approximate differentiation circuit (D5) is used as a differential circuit in a digital circuit. As shown in FIG. 16, the digital approximate differentiation circuit (D5) consists of one integrating circuit, one summing circuit, and two coefficient circuits.

Figure 17A:
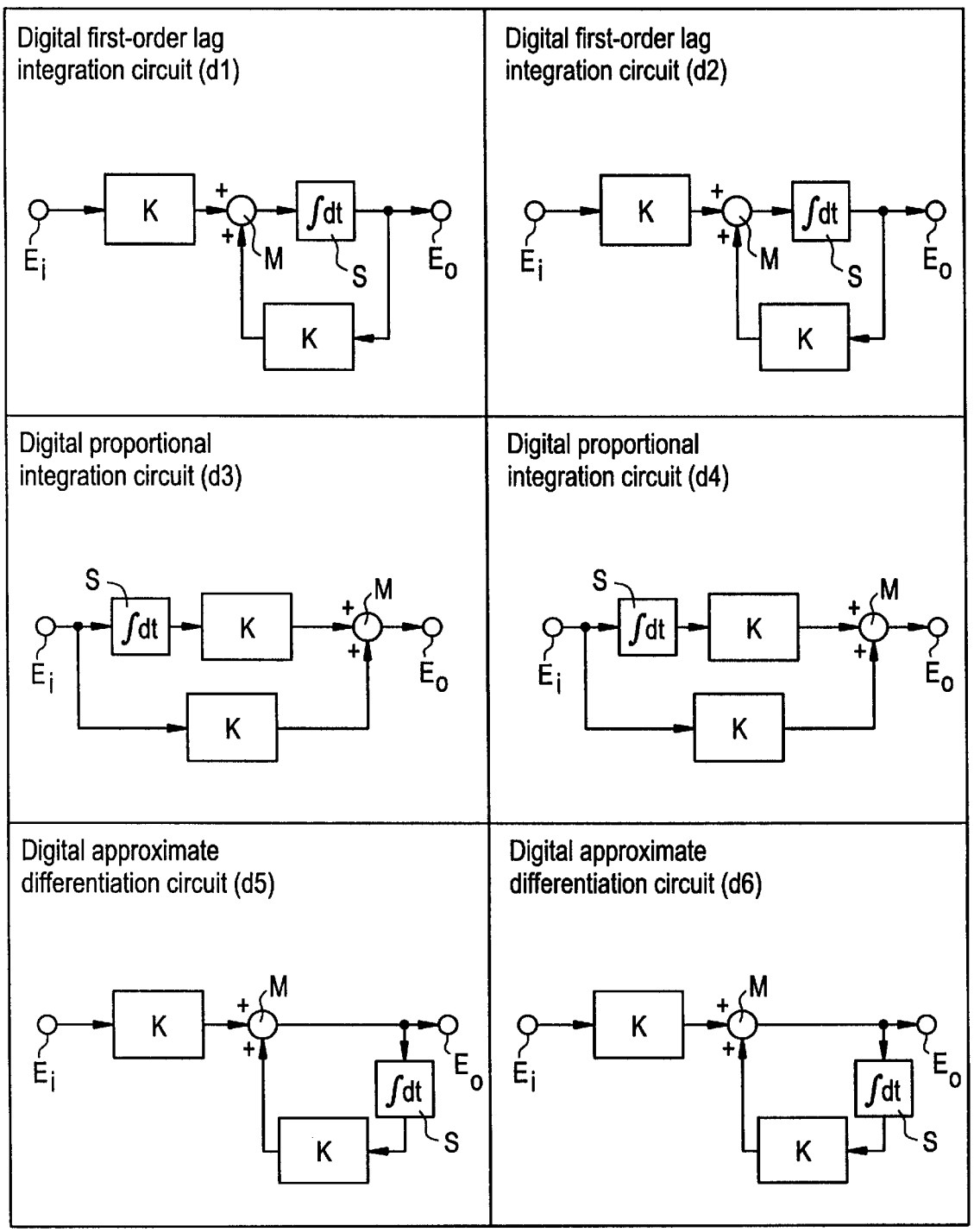
FIG. 17 is a list of circuit diagrams of various types of basic digital arithmetic circuits on which the present invention is based.
Figure 17B:
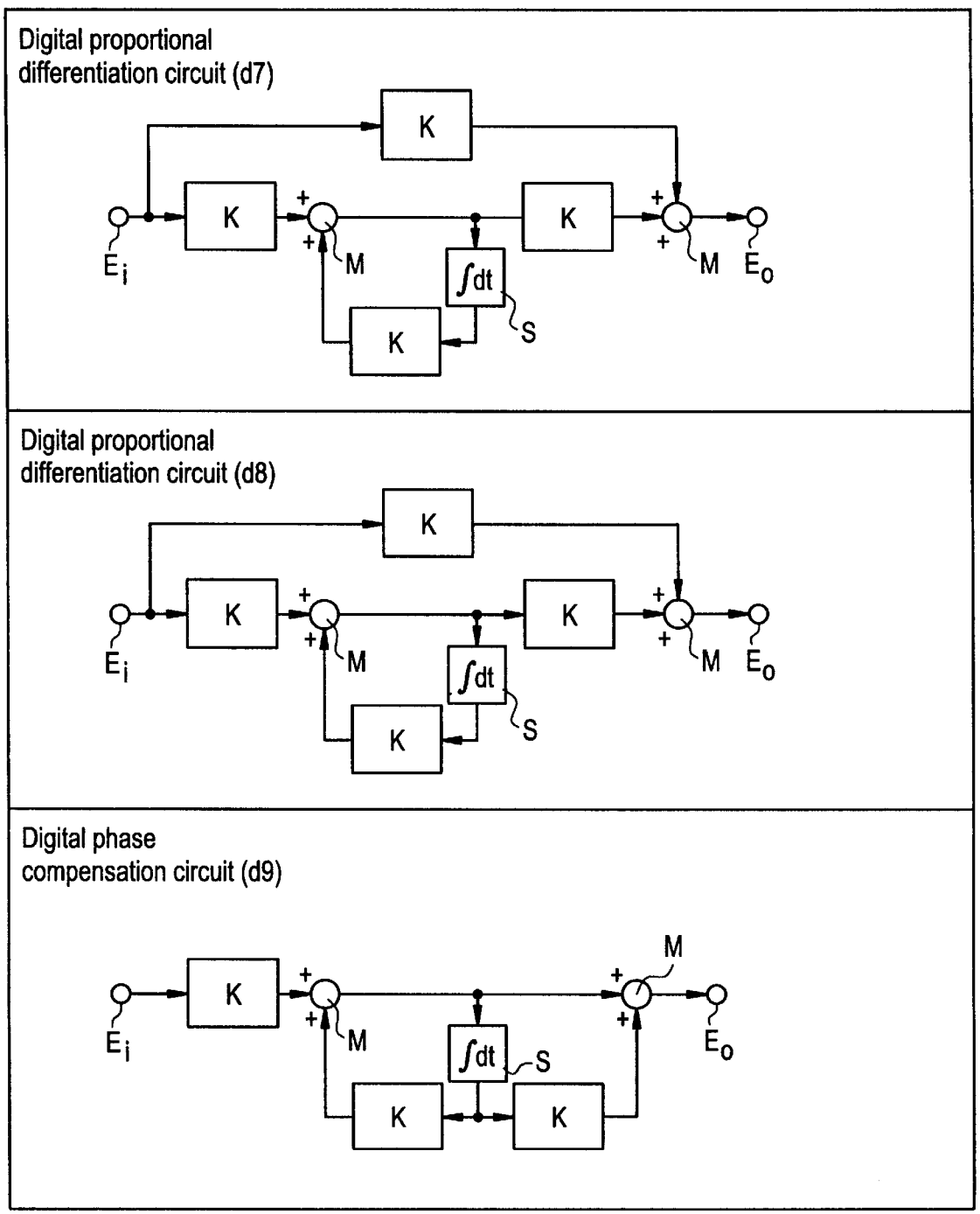
Figure 17C:
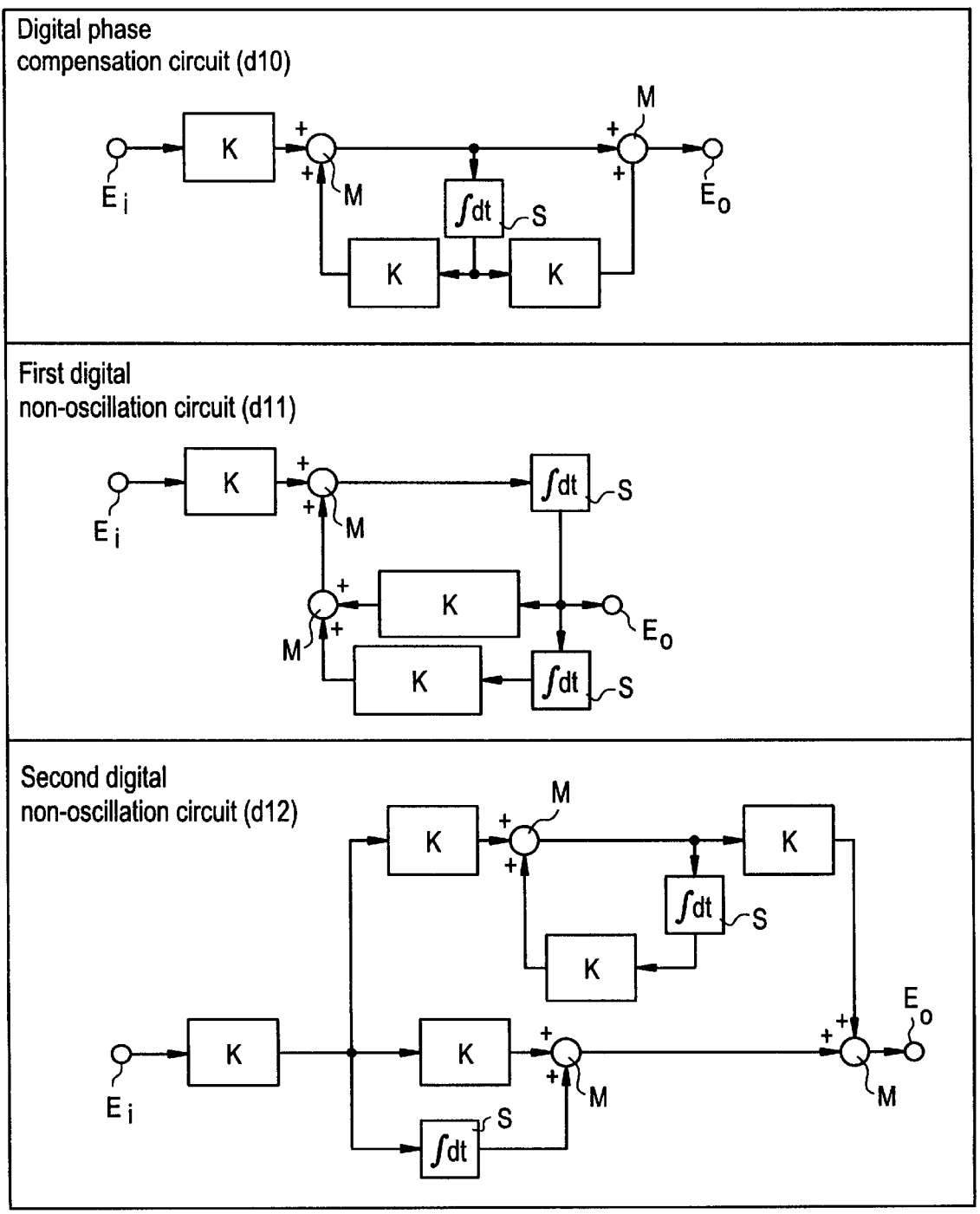

The differentiating circuit (B) in each of the digital circuits (D7) (D8) and (D12) is replaced by the approximate differentiation circuit in the form of the integrating circuit as shown in FIG. 16, and each basic digital circuit shown in FIG. 15 is normalized such that the coefficient circuits are positioned according to a predetermined rule. In this manner, basic digital arithmetic circuits, i.e., digital first-order lag integration circuits (d1) (d2), digital proportional integration circuits (d3), (d4), digital approximate differentiation circuits (d5) (d6), digital proportional differentiation circuits (d7) (d8), digital phase compensation circuits (d9), (d10), first digital non-oscillation circuit (d11), and second digital non-oscillation circuit (d12), are designed as shown in FIG. 17. These basic digital arithmetic circuits, namely, the first-order lag integration circuits (d1) (d2), proportional integration circuits (d3) (d4), approximate differentiation circuits (d5) (d6), proportional differentiation circuits (d7) (d8), phase compensation circuits (d9) (d10), first non-oscillation circuit (d11) and second non-oscillation circuit (d12), correspond to the analog first-order lag integration circuits (A1) (A2), analog proportional integration circuits (A3) (A4), analog approximate differentiation circuits (A5) (A6), analog proportional differentiation circuits (A7) (A8), analog phase compensation circuits (A9) (A10), first analog non-oscillation circuit (A11), and second analog non-oscillation circuit (A12), respectively.

Figure 18:
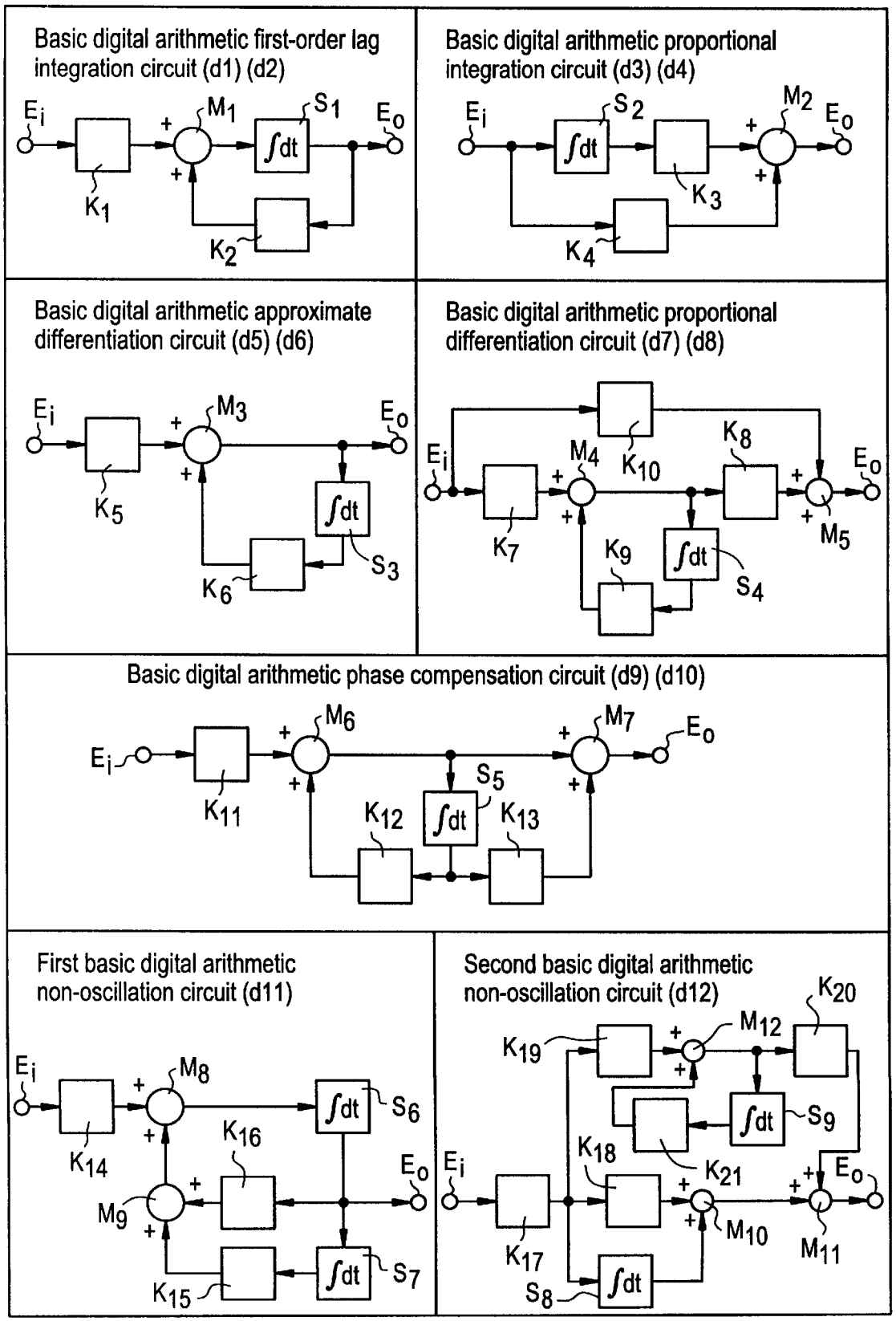
FIG. 18 is a list of circuit diagrams of various types of basic digital arithmetic circuits obtained as a result of normalization of the circuits of FIG. 17.

The above-indicated basic digital arithmetic circuits may be classified into seven types or groups of basic digital arithmetic circuits, each of which has a similar circuit pattern in terms of the position of the integrating circuit (S). FIG. 18 shows these seven types of basic digital circuits that consist of a basic digital arithmetic first-order lag integration circuit (d1) (d2), basic digital arithmetic proportional integration circuit (d3) (d4), basic digital arithmetic approximate differentiation circuit (d5) (d6), basic digital arithmetic proportional differentiation circuit (d7) (d8), basic digital arithmetic phase compensation circuit (d9) (d10), first basic digital arithmetic non-oscillation circuit (d11), and second basic digital arithmetic non-oscillation circuit (d12).

More specifically, the digital first-order lag integration circuit (d1) (d2) includes coefficient circuit ($K_1$), summing circuit ($M_1$) and integrating circuit ($S_1$) that are connected in series in this order, and a coefficient circuit ($K_2$) connected between the other input terminal of the summing circuit ($M_1$) and the output terminal of the integrating circuit ($S_1$). The digital proportional integration circuit (d3) (d4) includes integrating circuit ($S_2$), coefficient circuit ($K_3$) and summing circuit ($M_2$) that are connected in series in this order, and a coefficient circuit ($K_4$) connected between the input terminal of the integrating circuit ($S_2$) and the other input terminal of the summing circuit ($M_2$).

The digital approximate differentiation circuit (d5) (d6) includes coefficient circuit ($K_5$) and summing circuit ($M_3$) that are connected in series, and integrating circuit ($S_3$) and coefficient circuit ($K_6$) that are connected in series between the output terminal and the other input terminal of the summing circuit ($M_3$). The digital proportional differentiation circuit (d7) (d8) includes coefficient circuit ($K_7$), summing circuit ($M_4$), coefficient circuit ($K_8$) and summing circuit ($M_5$) that are connected in series in this order, integrating circuit ($S_4$) and coefficient circuit ($K_9$) connected in series between the output terminal and the other input terminal of the summing circuit ($M_4$), and a coefficient circuit ($K_{10}$) connected between the input terminal of the coefficient circuit ($K_7$) and the other input terminal of summing circuit ($M_5$). In the digital phase compensation circuit (d9) (d10), coefficient circuit ($K_{11}$), summing circuit ($M_6$) and summing circuit ($M_7$) are connected in series in this order, integrating circuit ($S_5$) and coefficient circuit ($K_{12}$) are connected between the output terminal and the other input terminal of the summing circuit ($M_6$), and integrating circuit ($S_5$) and coefficient circuit ($K_{13}$) are connected in series between the output terminal of the summing circuit ($M_6$) and the other input terminal of the summing circuit ($M_7$).

The first digital non-oscillation circuit (d11) includes coefficient circuit ($K_{14}$), summing circuit ($M_8$) and integrating circuit ($S_6$) that are connected in series in this order, integrating circuit ($S_7$), coefficient circuit ($K_{15}$) and summing circuit ($M_5$) that are connected in series between the output terminal of the integrating circuit ($S_6$) and the other input terminal of the summing circuit ($M_8$), and a coefficient circuit ($K_{16}$) connected between the output terminal of the integrating circuit ($S_6$) and the other input terminal of the summing circuit ($M_9$). The second digital non-oscillation circuit (d12) includes coefficient circuit ($K_{17}$), coefficient circuit ($K_{18}$), summing circuit ($M_{10}$) and summing circuit ($M_{11}$) that are connected in series in this order, integrating circuit ($S_8$) connected between the input terminal of the coefficient circuit ($K_{18}$) and the other input terminal of the summing circuit ($M_{10}$), coefficient circuit ($K_{19}$), summing circuit ($M_{12}$) and coefficient circuit ($K_{20}$) that are connected in series between the input terminal of the coefficient circuit ($K_{18}$) and the other input terminal of the summing circuit ($M_{11}$), and integrating circuit ($S_9$) and coefficient circuit ($K_{21}$) that are connected in series between the output terminal and other input terminal of the summing circuit ($M_{12}$).

According to the present invention, various digital arithmetic circuits including the integrating circuits (S), summing circuits (M) and coefficient circuits (K) as described above and having different arithmetic functions are selectively constructed on a single integrated circuit. To this end, control means is needed for changing the circuit configuration of the integrated circuit. Thus, according to the present invention, a composite digital network is constructed as a fixed integrated circuit, which consists of integrating circuit (s), summing circuits, and coefficient circuits including those for changing the circuit configuration, and a selected one of the digital arithmetic circuits having different arithmetic functions is constructed on the composite digital network by changing coefficients of these coefficient circuits.

Figure 19:
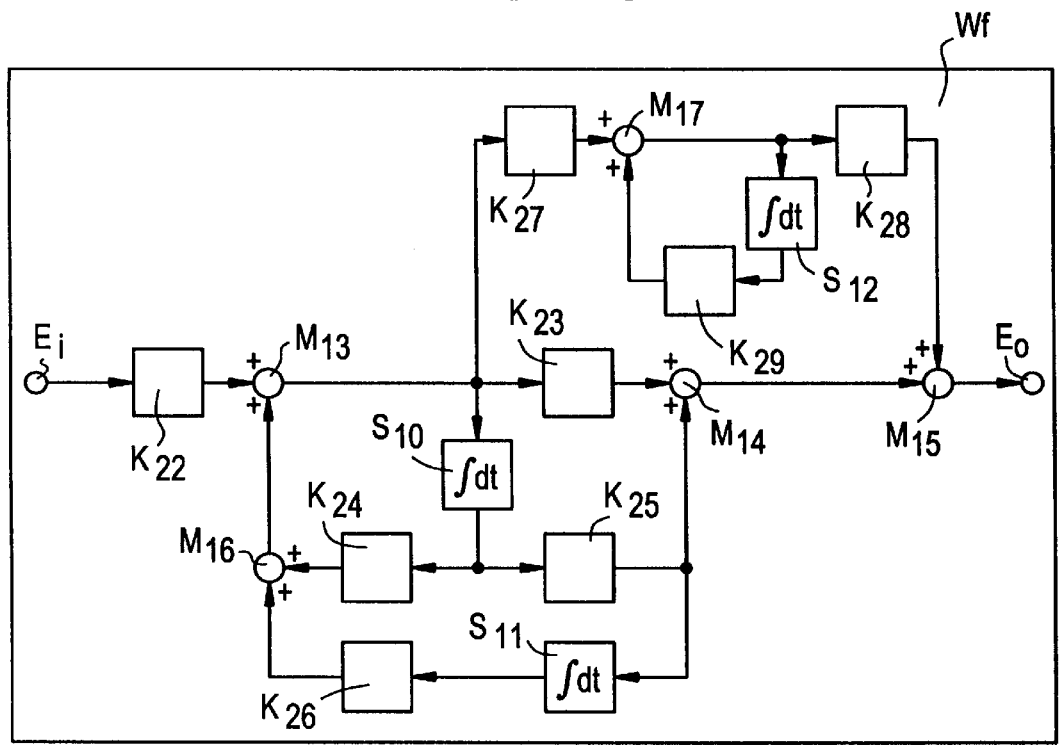
FIG. 19 is a full-spec circuit diagram showing one embodiment of a generic digital arithmetic integrated circuit of the present invention.

FIG. 19 shows one example of generic digital arithmetic integrated circuit (Wf) as one embodiment of the present invention, which can selectively provide any one of all of the basic digital arithmetic circuits shown in FIG. 17, namely, first-order lag integration circuit (d1) (d2), proportional integration circuit (d3) (d4), approximate differentiation circuit (d5) (d6), proportional differentiation circuit (d7) (d8), phase compensation circuit (d9) (d10), first non-oscillation circuit (d11) and second non-oscillation circuit (d12). This generic digital arithmetic integrated circuit (Wf) capable of providing any of these twelve types of basic digital arithmetic circuits will be called "full-sped circuit" in the present specification. The full-spec circuit (Wf) is constructed such that coefficient circuit ($K_{22}$), summing circuit ($M_{13}$), coefficient circuit ($K_{23}$), summing circuit ($M_{14}$) and summing circuit ($M_{15}$) are connected in series in this order, and integrating circuit ($S_{10}$), coefficient circuit ($K_{24}$) and summing circuit ($M_{16}$) are connected in series between the output terminal and the other input terminal of the summing circuit ($M_{13}$), while the integrating circuit ($S_{10}$) and coefficient circuit ($K_{25}$) are connected in series between the output terminal of the summing circuit ($M_{13}$) and the other input terminal of the summing circuit ($M_{14}$). Further, integrating circuit ($S_{11}$) and coefficient circuit ($K_{26}$) are connected in series between the output terminal of the coefficient circuit ($K_{25}$) and the other input terminal of the summing circuit ($M_{16}$), and coefficient circuit ($K_{27}$), summing circuit ($M_{17}$) and coefficient circuit ($K_{28}$) are connected in series between the output terminal of the summing circuit ($M_{13}$) and the other input terminal of the summing circuit ($M_{15}$), while integrating circuit ($S_{12}$) and coefficient circuit ($K_{29}$) are connected in series between the output terminal and the other input terminal of the summing circuit ($M_{17}$).

With regard to the coefficient circuits ($K_{22}$) through ($K_{29}$) of the above-described full-spec circuit (Wf), the coefficients "k" of such coefficient circuits that are held in a connected state and generate their inputs are set to "1", and the coefficients "k" of such coefficient circuits that are held in a shut-off state and do not generate their inputs are set to "0", while the coefficients of the remaining coefficient circuits are set to suitable values. In this manner, the full-spec circuit (Wf) can provide each of the basic digital arithmetic circuits (d1) through (d12) of FIG. 18 that represent the twelve types of basic digital arithmetic circuits (d1) through (d12) shown in FIG. 17.

Figure 20:
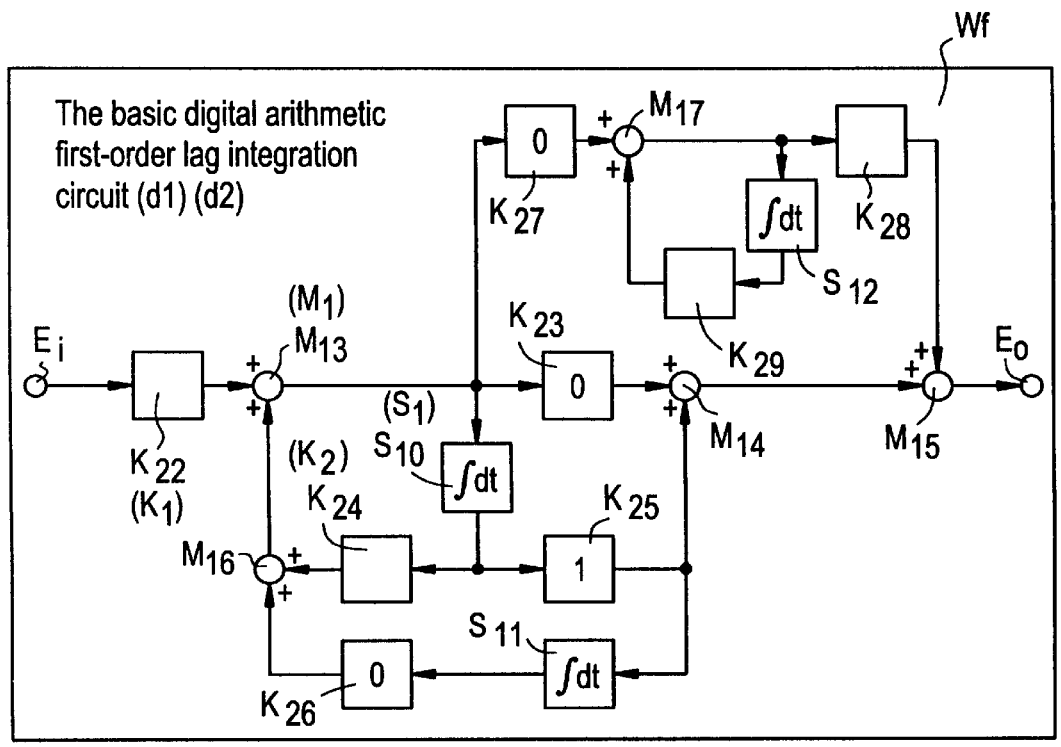
FIG. 20 is a circuit diagram of a basic digital arithmetic first-order lag integration circuit that is selectively constructed on the full-spec circuit of the embodiment of FIG. 19.
Figure 21:
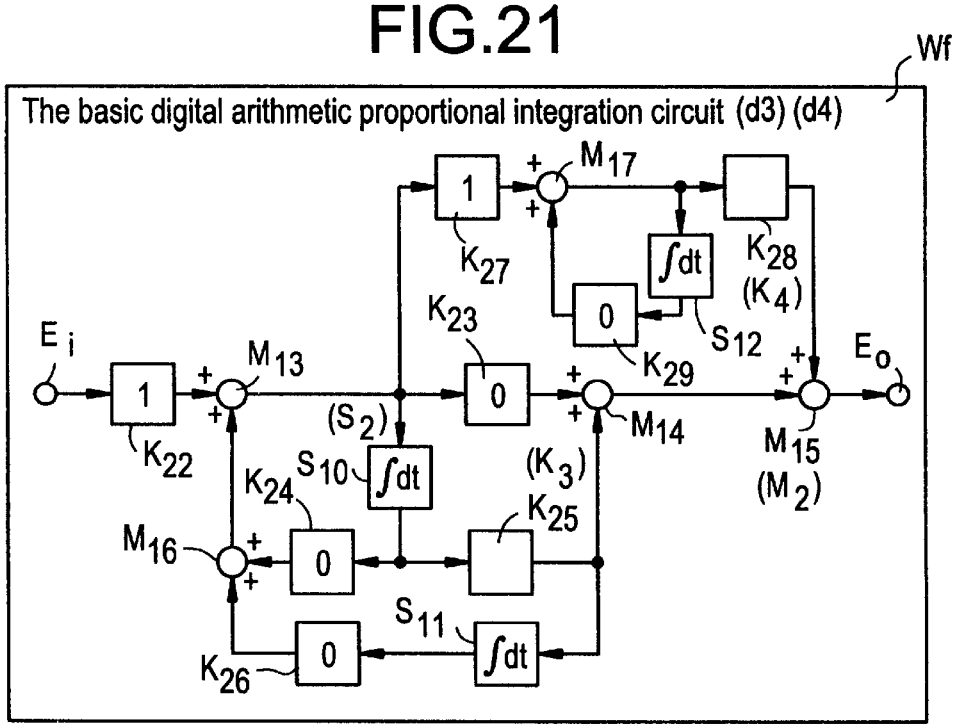
FIG. 21 is a circuit diagram of a basic digital arithmetic proportional integration circuit that is selectively constructed on the full-spec circuit of the embodiment of FIG. 19.
Figure 22:
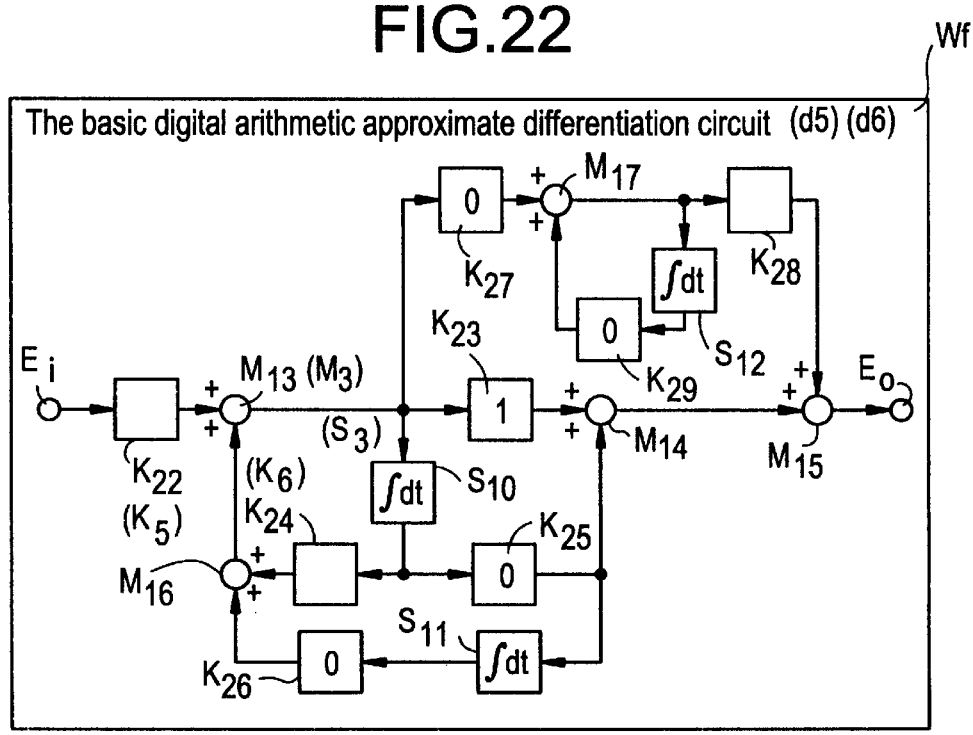
FIG. 22 is a circuit diagram of a basic digital arithmetic approximate differentiation circuit that is selectively constructed on the full-spec circuit of the embodiment of FIG. 19.
Figure 23:
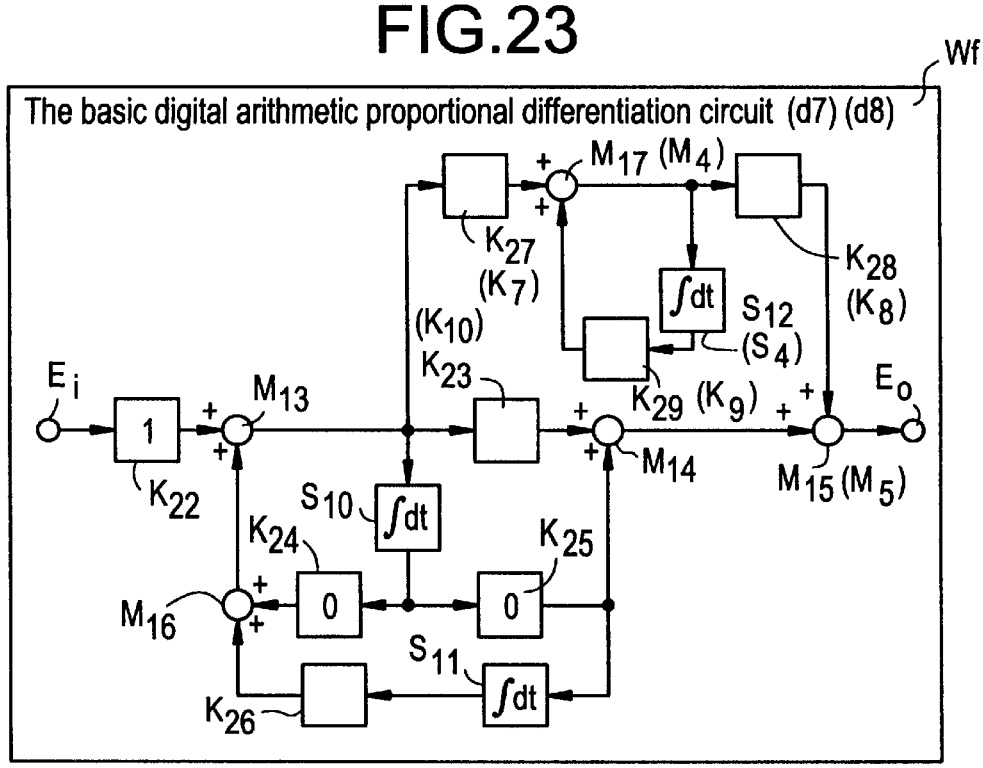
FIG. 23 is a circuit diagram of a basic digital arithmetic proportional differentiation circuit that is selectively constructed on the full-spec circuit of the embodiment of FIG. 19.
Figure 24:
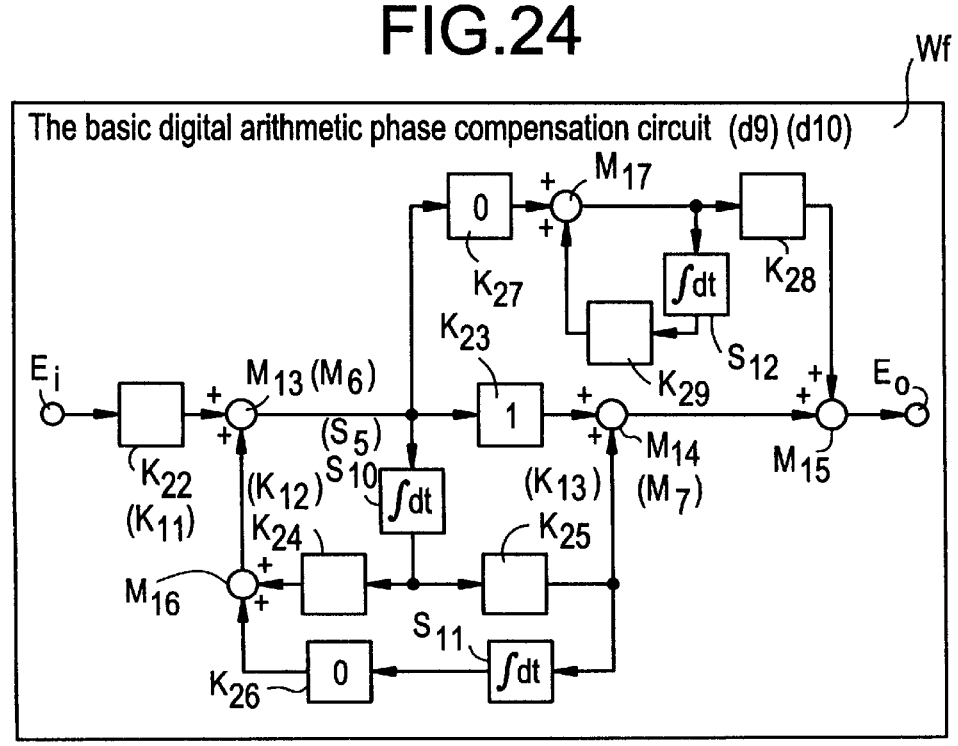
FIG. 24 is a circuit diagram of a basic digital arithmetic phase compensation circuit that is selectively constructed on the full-spec circuit of the embodiment of FIG. 19.
Figure 25:
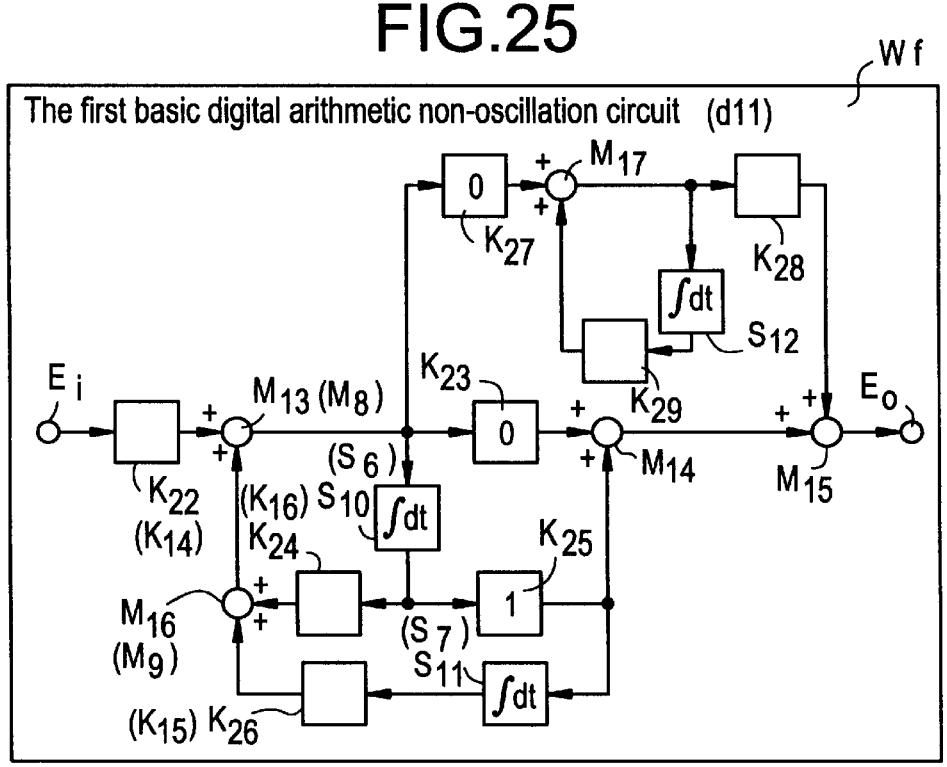
FIG. 25 is a circuit diagram of a first basic digital arithmetic non-oscillation circuit that is selectively constructed on the full-spec circuit of the embodiment of FIG. 19.
Figure 26:
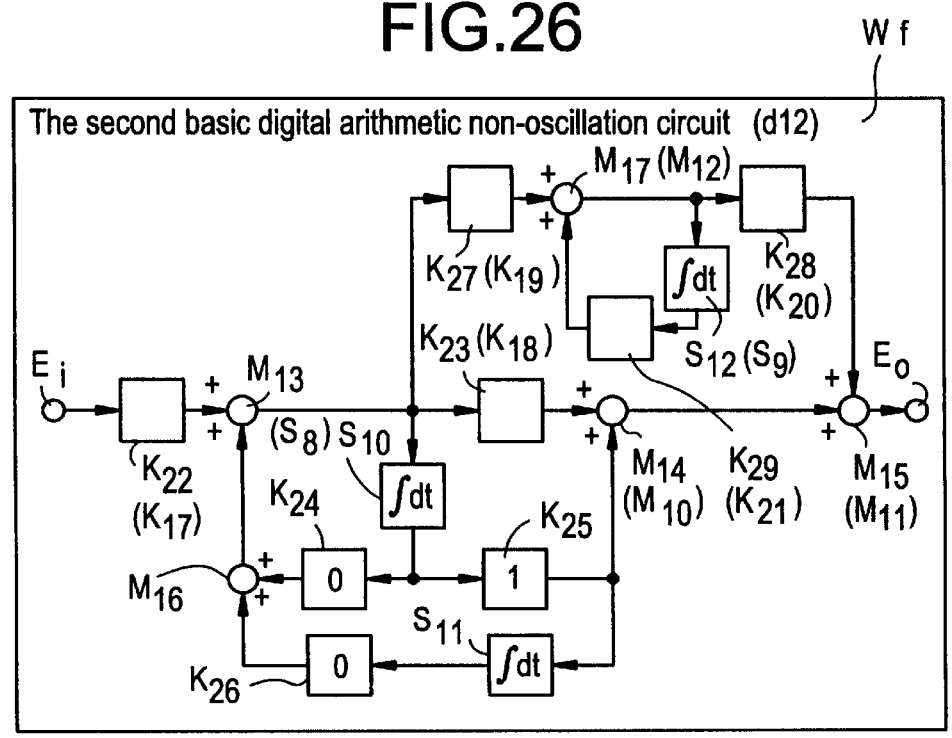
FIG. 26 is a circuit diagram of a second basic digital arithmetic non-oscillation circuit that is selectively constructed on the full-spec circuit of the embodiment of FIG. 19.

More specifically, the coefficient of the coefficient circuit ($K_{25}$) is set to "1", and the coefficients of the coefficient circuits ($K_{23}$) ($K_{26}$) ($K_{27}$) are set to "0", as shown in FIG. 20, so as to provide the basic digital arithmetic first-order lag integration circuit (d1) (d2) shown in FIG. 18. The basic digital arithmetic proportional integration circuit (d3) (d4) shown in FIG. 18 is obtained by setting the coefficients of the coefficient circuits ($K_{22}$) ($K_{27}$) to "1", and setting the coefficients of the coefficient circuits ($K_{23}$) ($K_{24}$) ($K_{26}$) ($K_{29}$) to "0", as shown in FIG. 21. The basic digital arithmetic approximate differentiation circuit (d5) (d6) shown in FIG. 18 is obtained by setting the coefficient of the coefficient circuit ($K_{23}$) to "1", and setting the coefficients of the coefficient circuits ($K_{25}$) ($K_{26}$) ($K_{27}$) to "0", as shown in FIG. 22. The basic digital arithmetic proportional differentiation circuit (d7) (d8) shown in FIG. 18 is obtained by setting the coefficient of the coefficient circuit ($K_{22}$) to "1", and setting the coefficients of the coefficient circuits ($K_{24}$) ($K_{25}$) to "0", as shown in FIG. 23. The basic digital arithmetic phase compensation circuit (d9) (d10) shown in FIG. 18 is obtained by setting the coefficient of the coefficient circuit ($K_{23}$) to "1", and setting the coefficients of the coefficient circuits ($K_{26}$) ($K_{27}$) to "0", as shown in FIG. 24. The first basic digital arithmetic non-oscillation circuit (d11) shown in FIG. 18 is obtained by setting the coefficient of the coefficient circuit ($K_{25}$) to "1", and setting the coefficients of the coefficient circuits ($K_{23}$) ($K_{27}$) to "0", as shown in FIG. 25. The second basic digital arithmetic non-oscillation circuit (d12) shown in FIG. 18 is obtained by setting the coefficient of the coefficient circuit ($K_{25}$) to "1", and setting the coefficients of the coefficient circuits ($K_{24}$) ($K_{26}$) to "0", as shown in FIG. 26. Thus, the full-spec circuit (Wf) consists of three integrating circuits ($S_{10}$) ($S_{11}$) ($S_{12}$), five summing circuits ($M_{13}$) ($M_{14}$) ($M_{15}$) ($M_{16}$) ($M_{17}$), and eight coefficient circuits ($K_{22}$) ($K_{23}$) ($K_{24}$) ($K_{25}$) ($K_{26}$) ($K_{27}$) ($K_{28}$) ($K_{29}$), and one of the integrating circuits is used for differentiation. Although the three integrating circuits ($S_{10}$) ($S_{11}$) ($S_{12}$) may be used at the same time, none of the above-indicated basic digital arithmetic circuits uses all of the three integrating circuits at the same time.

In the meantime, the functions of the first and second basic digital arithmetic non-oscillation circuits (d11) (d12) are actually used only in few cases. Accordingly, the use of the full-spec circuit (Wf) capable of providing all of the twelve types of the basic digital arithmetic circuits inevitably results in reduced efficiency with which the whole circuit is utilized, and the full-spec circuit includes a relatively large number of the integrating circuits (S), summing circuits (M) and coefficient circuits (K). In view of this, a generic digital arithmetic integrated circuit (Ws) which selectively provides any one of the basic digital arithmetic circuits except the first and second non-oscillation circuits (d11) (d12) may be used with high efficiency in actual applications. This generic digital arithmetic integrated circuit (Ws), which is called short-spec circuit" in this specification, can provide any one of the basic digital arithmetic circuits including the first-order lag integration circuit (d1) (d2), proportional integration circuit (d3) (d4), approximate differentiation circuit (d5) (d6), proportional differentiation circuit (d7) (d8), and phase compensation circuit (d9) (d10).

Figure 27:
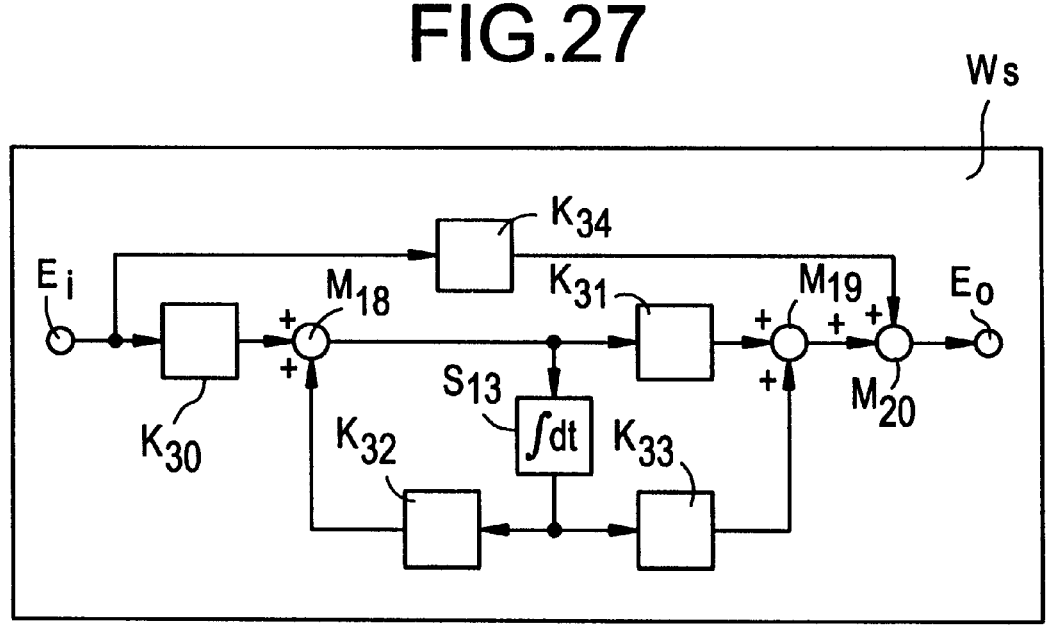
FIG. 27 is a short-spec circuit diagram showing another embodiment of the generic digital arithmetic integrated circuit of the present invention.

One example of the short-spec circuit (Ws) is shown in FIG. 27 as another embodiment of the present invention. This short-spec circuit (Ws) includes coefficient circuit ($K_{30}$), summing circuit ($M_{18}$), coefficient circuit ($K_{31}$), summing circuit ($M_{19}$) and summing circuit ($M_{20}$) that are connected in series in this order, integrating circuit ($S_{13}$) and coefficient circuit ($K_{32}$) connected in series between the output terminal and the other input terminal of the summing circuit ($M_{18}$), integrating circuit ($S_{13}$) and coefficient circuit ($K_{33}$) that are connected in series between the output terminal of the summing circuit ($M_{18}$) and the other input terminal of the summing circuit ($M_{19}$), and a coefficient circuit ($K_{34}$) connected between the input terminal of the coefficient circuit ($K_{30}$) and the other input terminal of the summing circuit ($M_{20}$).

With regard to the coefficient circuits ($K_{30}$) through ($K_{34}$) of the above-described short-spec circuit (Ws), the coefficients "k" of such coefficient circuits that are held in a connected state and generate their inputs are set to "1", and the coefficients "k" of such coefficient circuits that are held in a shut-off state and do not generate their inputs are set to "0", while the coefficients of the remaining coefficient circuits are set to suitable values. In this manner, the short-spec circuit (Ws) can provide the basic digital arithmetic circuits, such as the first-order lag integration circuits (d1) (d2), proportional integration circuits (d3) (d4), approximate differentiation circuits (d5) (d6), proportional differentiation circuits (d7) (d8), and phase compensation circuits (d9) (d10).

Figure 28:
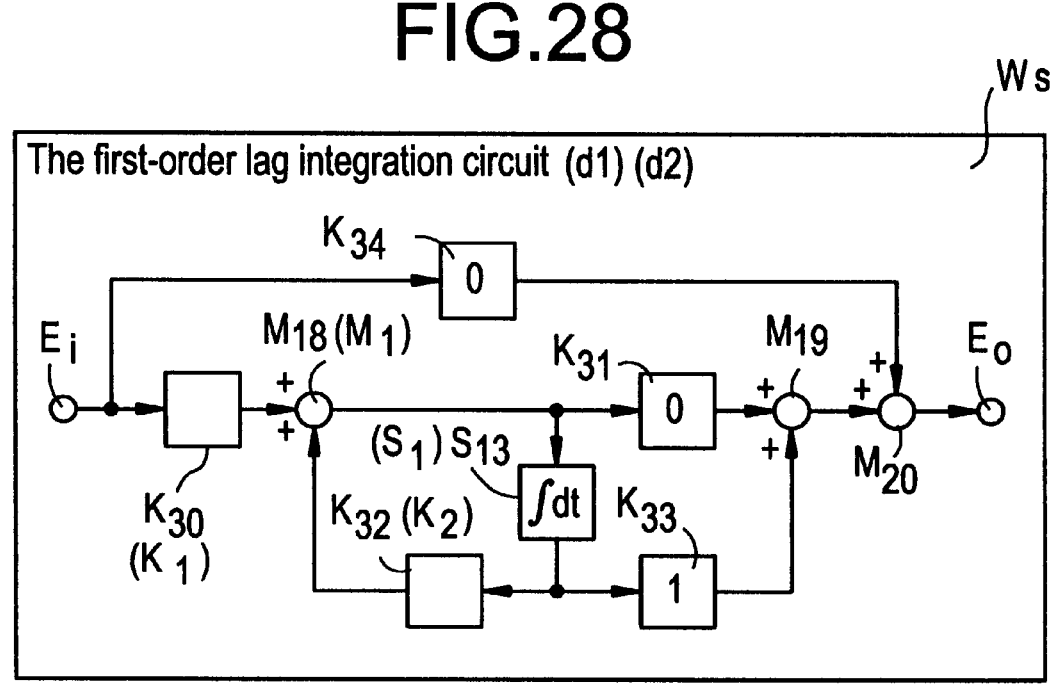
FIG. 28 is a circuit diagram of a basic digital arithmetic first-order lag integration circuit that is selectively constructed on the short-spec circuit of the embodiment of FIG. 27.
Figure 29:
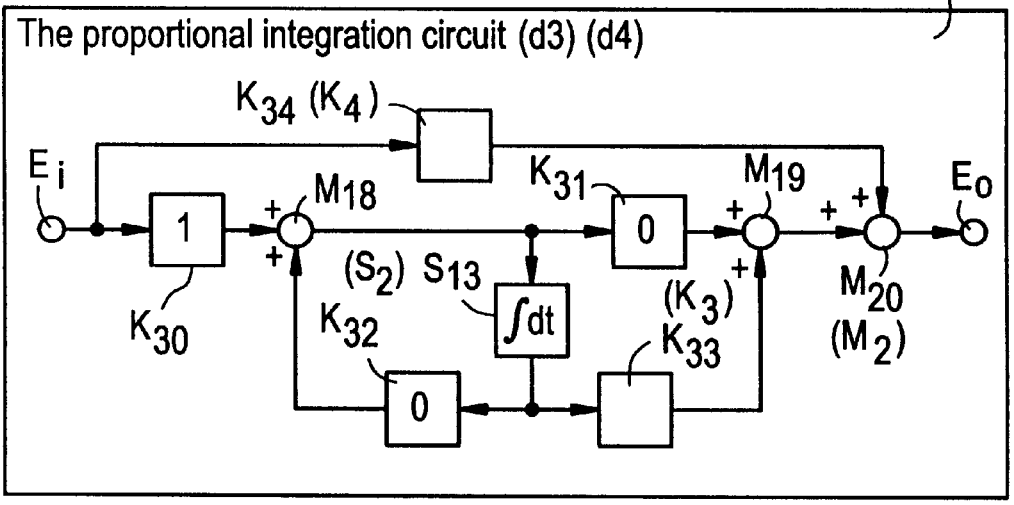
FIG. 29 is a circuit diagram of a basic digital arithmetic proportional integration circuit that is selectively constructed on the short-spec circuit of the embodiment of FIG. 27.
Figure 30:
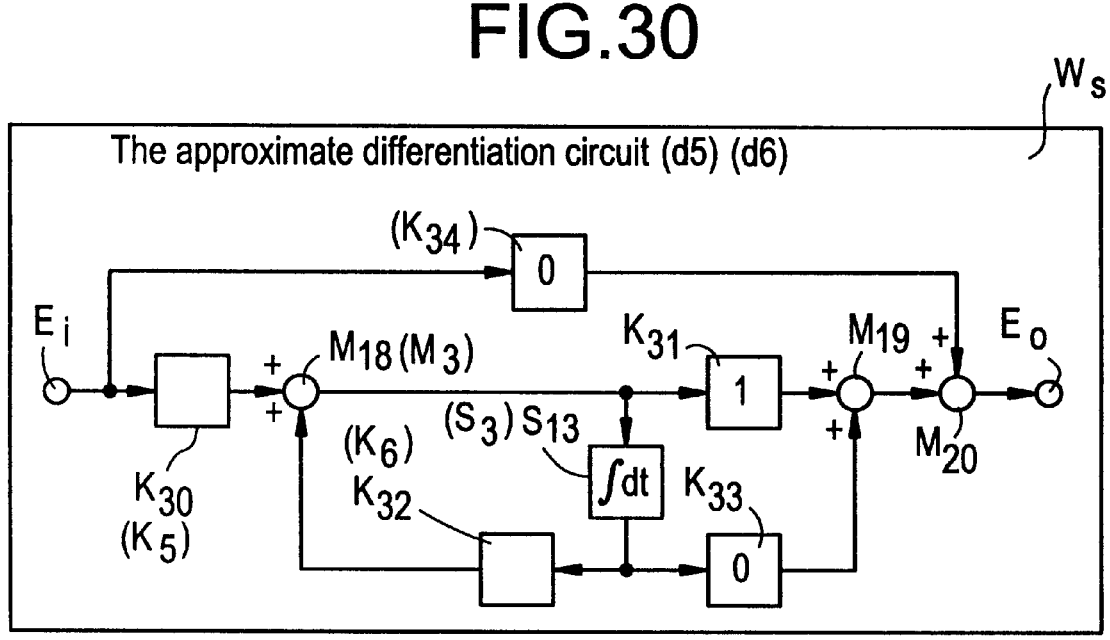
FIG. 30 is a circuit diagram of a basic digital arithmetic approximate differentiation circuit that is selectively constructed on the short-spec circuit of the embodiment of FIG. 27.
Figure 31:
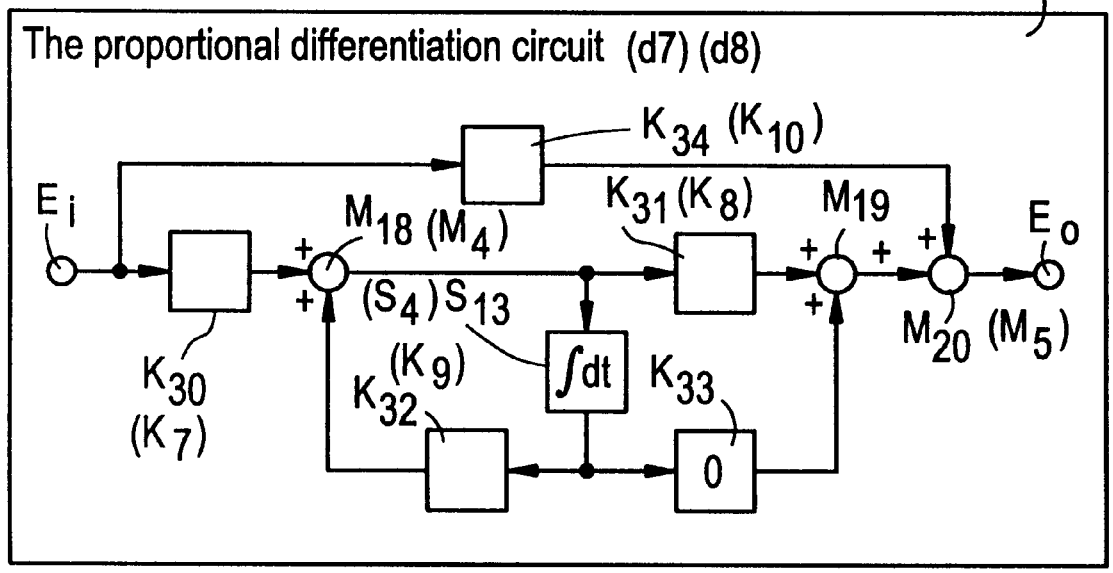
FIG. 31 is a circuit diagram of a basic digital arithmetic proportional differentiation circuit that is selectively constructed on the short-spec circuit of the embodiment of FIG. 27.
Figure 32:
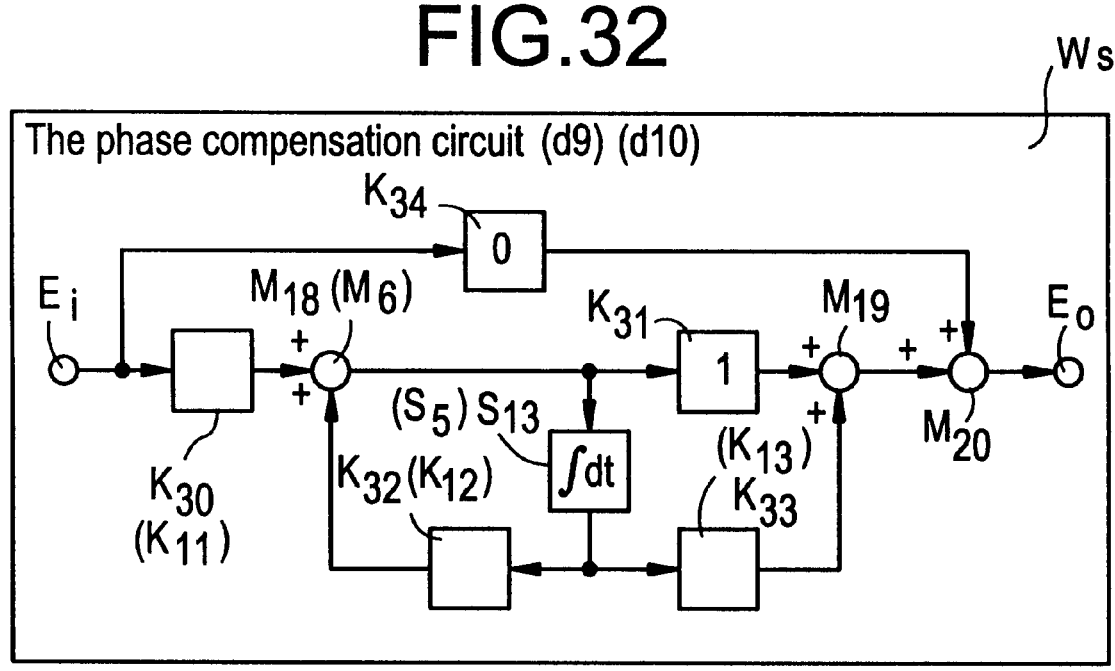
FIG. 32 is a circuit diagram of a basic digital arithmetic phase compensation circuit that is selectively constructed on the short-spec circuit of the embodiment of FIG. 27.

More specifically, the first-order lag integration circuit (d1) (d2) shown in FIG. 18 is obtained by setting the coefficient of the coefficient circuit ($K_{33}$) to "1", and setting the coefficient s of the coefficient circuit s ($K_{31}$) ($K_{34}$) to "0", as shown in FIG. 28. The proportional integration circuit (d3) (d4) shown in FIG. 18 is obtained by setting the coefficient of the coefficient circuit ($K_{30}$) to "1", and setting the coefficients of the coefficient circuits ($K_{31}$) ($K_{32}$) to "0", as shown in FIG. 29. The approximate differentiation circuit (d5) (d6) shown in FIG. 18 is obtained by setting the coefficient of the coefficient circuit ($K_{31}$) to "1" and setting the coefficients of the coefficient circuits ($K_{33}$) ($K_{34}$) to "0", as shown in FIG. 30. The proportional differentiation circuit (d7) (d8) shown in FIG. 18 is obtained by setting the coefficient of the coefficient circuit ($K_{33}$) to "0", as shown in FIG. 31. The phase compensation circuit (d9) (d10) shown in FIG. 18 is obtained by setting the coefficient of the coefficient circuit ($K_{31}$) to "1" and setting the coefficient of the coefficient circuit ($K_{34}$) to "0", as shown in FIG. 32.

Other embodiments of the present invention in the form of a composite short-spec circuit I (Wsf1) and a composite short-spec circuit II (Wsf2) will be now explained. The composite short-spec circuit I (Wsf1) consists of two or three short-spec circuits (Ws) as described above, which constitute the first basic digital arithmetic non-oscillation circuit (d11), and the composite short-spec circuit (Wsf2)

also consists of two or three short-spec circuits (Ws) which constitute the second basic digital arithmetic non-oscillation circuit (d12).

Figure 33:
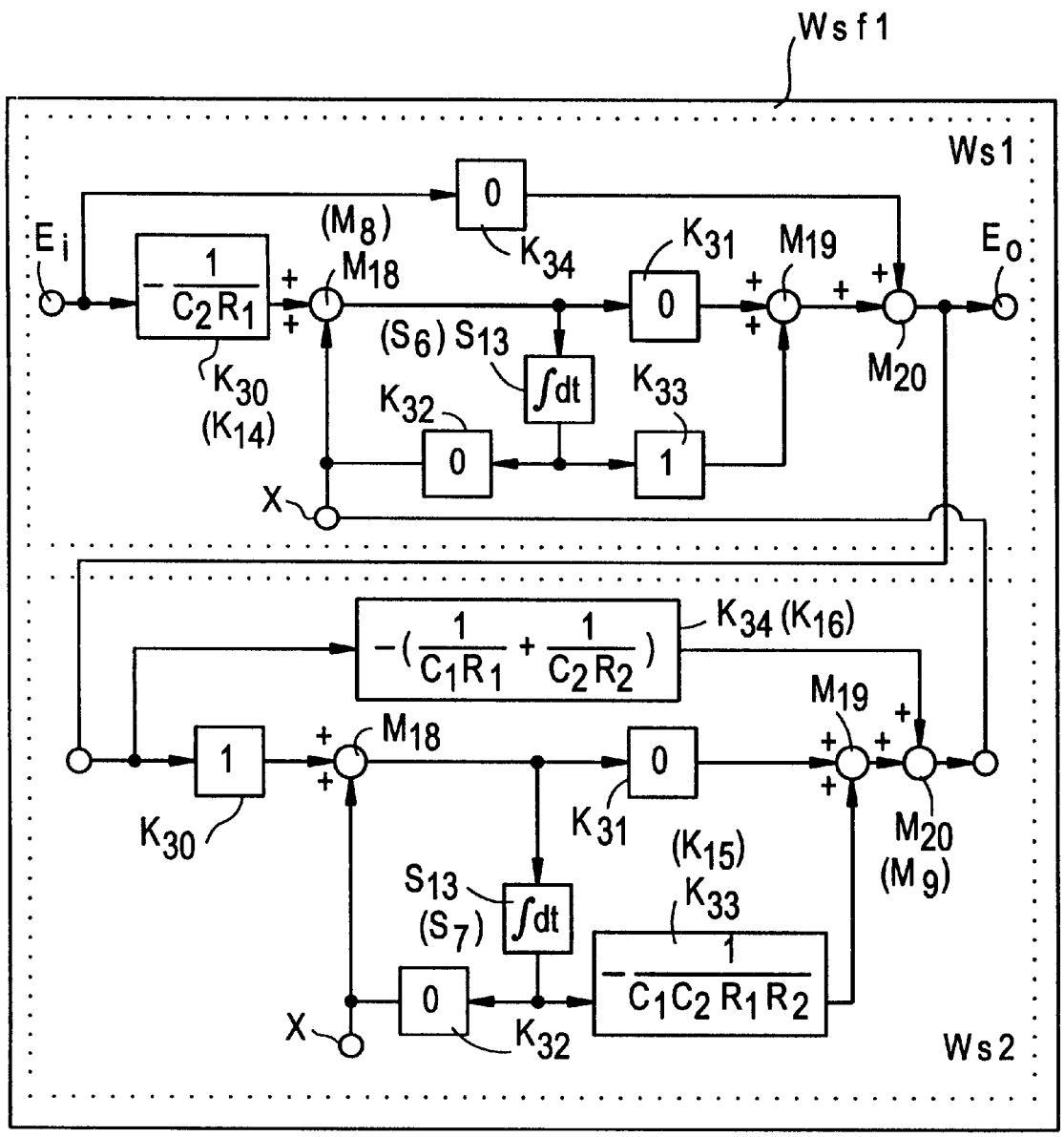
FIG. 33 is a circuit diagram of a simplified full-spec circuit as another embodiment of the present invention.

FIG. 33 shows one example of the composite short-spec circuit I (Wsf1) formed by using two short-spec circuits (Ws1) (Ws2) to which one lead (X) is added. The short-spec circuits (Ws1) (Ws2) have exactly the same circuit configuration as that shown in FIG. 27. The output terminal of the coefficient circuit ($K_{32}$) of the short-spec circuit (Ws1) is connected to the output terminal of the summing circuit ($M_{20}$) of the short-spec circuit (Ws2) via the lead (X), and the input terminal of the coefficient circuit ($K_{30}$) of the short-spec circuit (Ws2) is connected to the output terminal of the summing circuit ($M_{20}$) of the short-spec circuit (Ws1). Then, coefficients of the coefficient circuits ($K_{30}$) ($K_{31}$) ($K_{32}$) ($K_{33}$) ($K_{34}$) of the respective short-spec circuits (Ws1) (Ws2) are set to values as shown in FIG. 33, so as to provide a first basic digital arithmetic non-oscillation circuit (d11).

Figure 34:
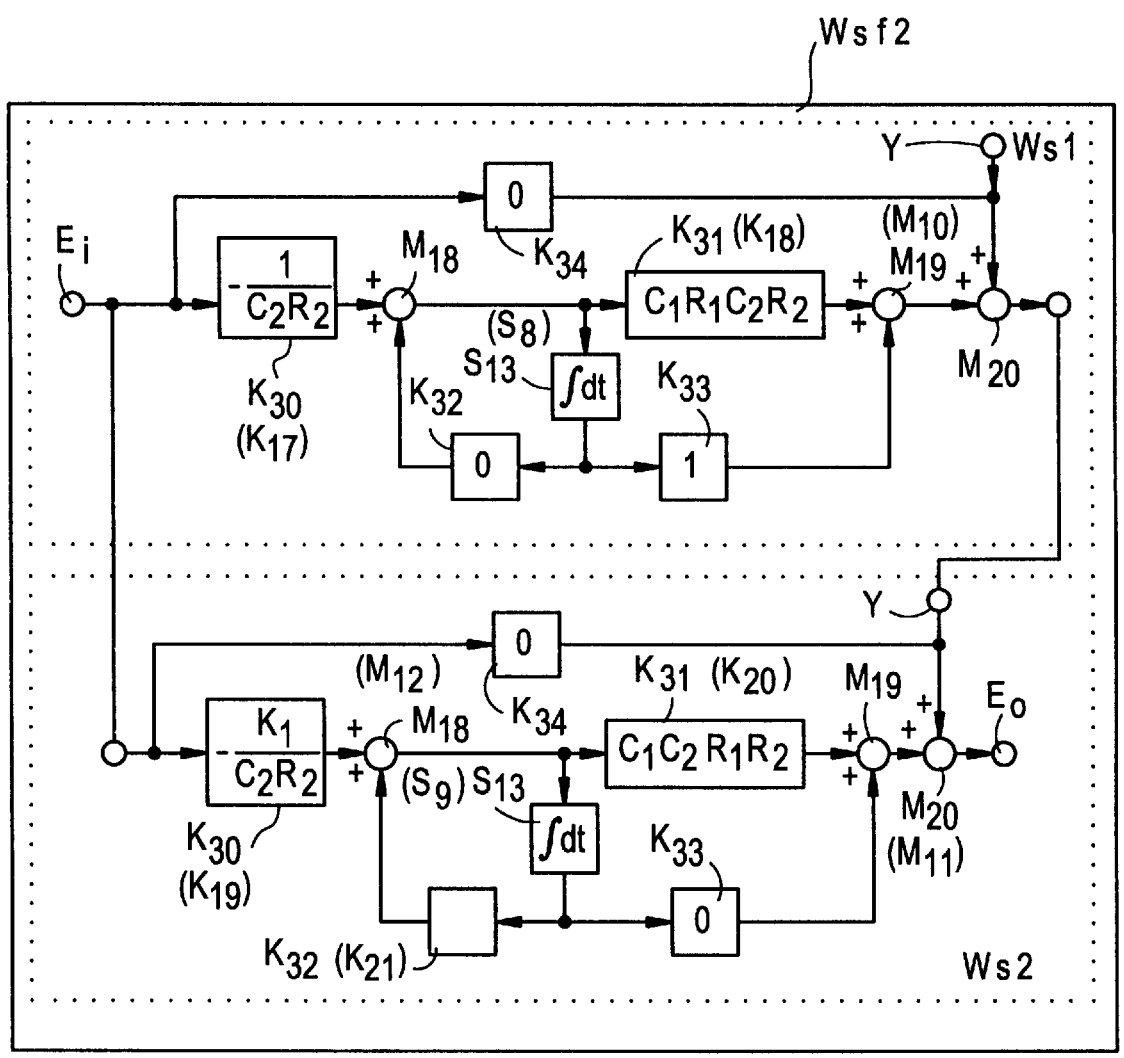
FIG. 34 is a circuit diagram of a simplified full-spec circuit as a further embodiment of the present invention.

FIG. 34 shows one example of the composite short-spec circuit II (Wsf2) formed by using two short-spec circuits (Ws1) (Ws2) to which one lead (Y) is added. The short-spec circuits (Ws1) (Ws2) have exactly the same circuit configuration as that shown in FIG. 27. The input terminal of the coefficient circuit ($K_{30}$) of the short-spec circuit (Ws1) is connected to the input terminal of the coefficient circuit ($K_{30}$) of the short-spec circuit (Ws2), and the output terminal of the summing circuit ($M_{20}$) of the short-spec circuit (Ws1) is connected to the output terminal of the coefficient circuit ($K_{34}$) of the short-spec circuit (Ws2) via the lead (Y). Then, coefficients of the coefficient circuits ($K_{30}$) ($K_{31}$) ($K_{32}$) ($K_{33}$) ($K_{34}$) of the respective short-spec circuits (Ws1) (Ws2) are set to values as shown in FIG. 34, so as to provide a second basic digital arithmetic non-oscillation circuit (d12).

Figure 35:
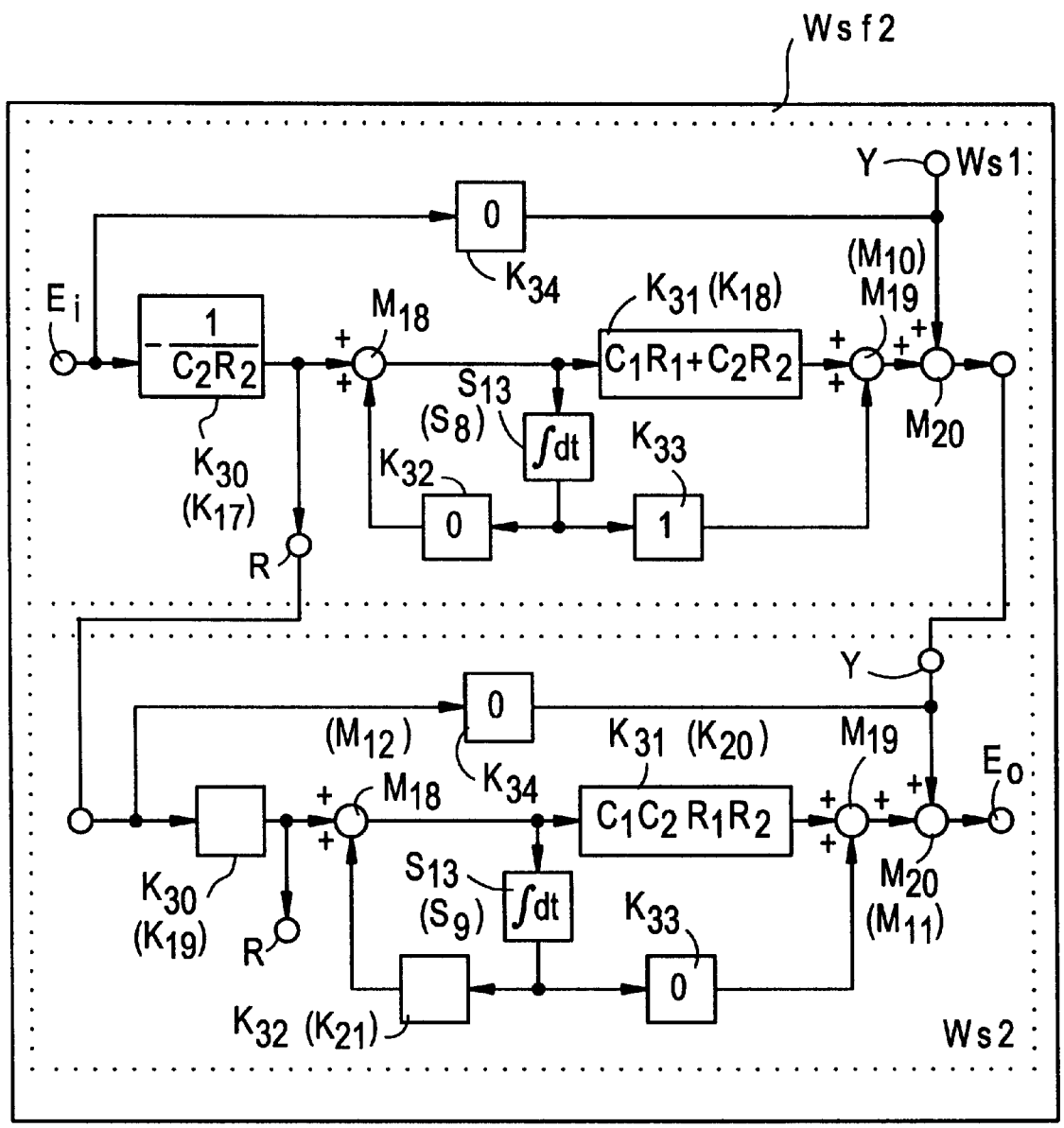
FIG. 35 is a circuit diagram of a simplified full-spec circuit as a still another embodiment of the present invention.

FIG. 35 shows another example of the composite short-spec circuit II (Wsf1) formed by using two short-spec circuits (Ws1) (Ws2) to which two leads (Y) (R) is added. The short-spec circuits (Ws1) (Ws2) have exactly the same circuit configuration as that shown in FIG. 27. The output terminal of the coefficient circuit ($K_{30}$) of the short-spec circuit (Ws1) is connected to the input terminal of the coefficient circuit ($K_{30}$) of the short-spec circuit (Ws2) via the lead (R), and the output terminal of the coefficient circuit ($K_{34}$) of the short-spec circuit (Ws2) is connected to the output terminal of the summing circuit ($M_{20}$) of the short-spec circuit (Ws1) via the lead (Y). Then, coefficients of the coefficient circuits ($K_{30}$) ($K_{31}$) ($K_{32}$) ($K_{33}$) ($K_{34}$) of the respective short-spec circuits (Ws1) (Ws2) are set to values as shown in FIG. 35, so as to provide a second basic digital arithmetic non-oscillation circuit (d12).

Figure 36:
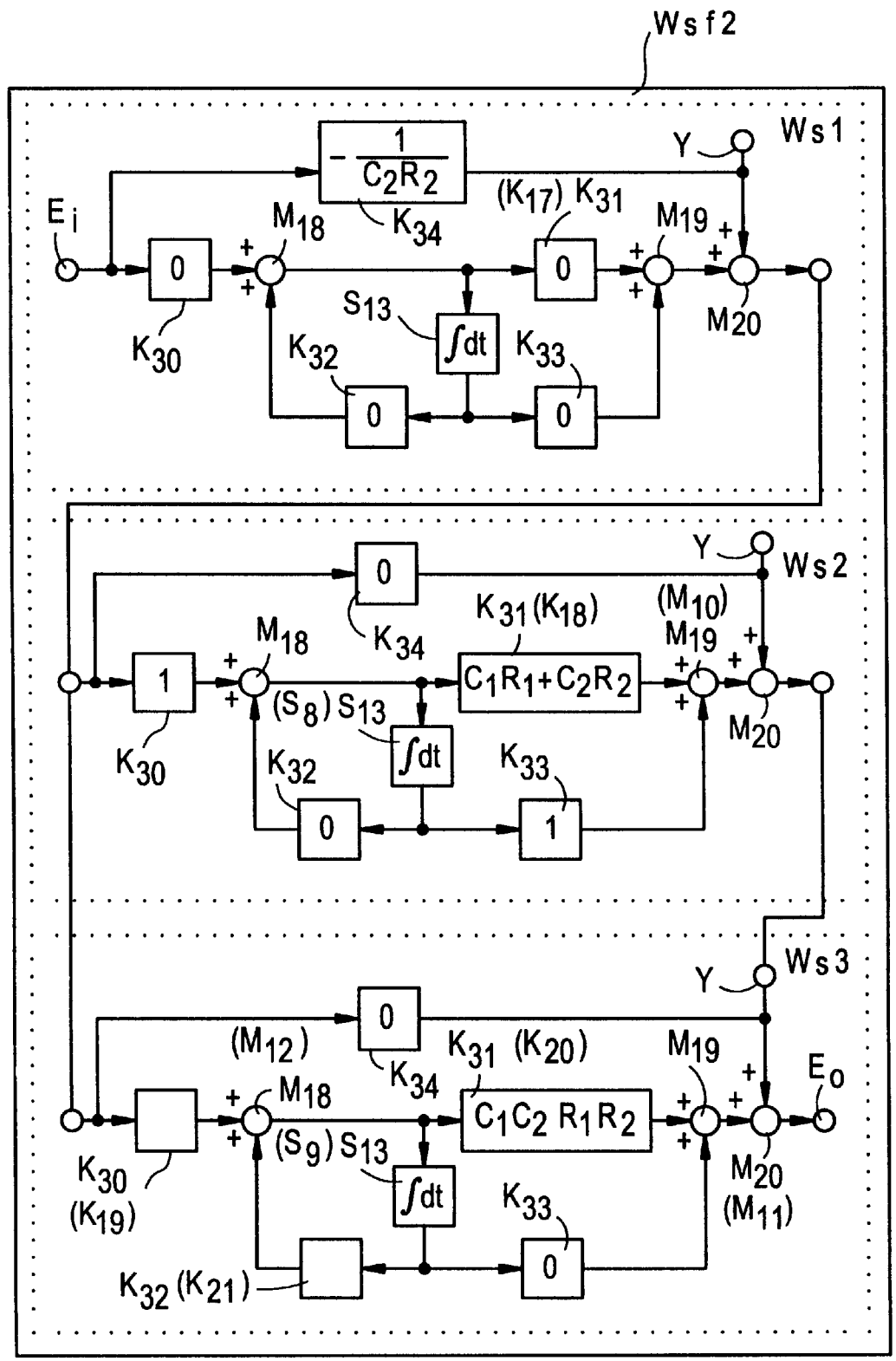
FIG. 36 is a circuit diagram of a simplified full-spec circuit as another embodiment of the present invention.

FIG. 36 shows a further example of the composite short-spec circuit II (Wsf2) formed by using three short-spec circuits (Ws1) (Ws2) (Ws3) to which one lead (Y) is added. The short-spec circuits (Ws1) (Ws2) (Ws3) have exactly the same circuit configuration as that shown in FIG. 27. The output terminal of the summing circuit ($M_{20}$) of the short-spec circuit (Ws1) is connected to the input terminal of the coefficient circuit ($K_{30}$) of the short-spec circuit (Ws2) and the input terminal of the coefficient circuit ($K_{30}$) of the short-spec circuit (Ws3), and the output terminal of the coefficient circuit ($K_{34}$) of the short-spec circuit (Ws3) is connected to the output terminal of the summing circuit ($M_{20}$) of the short-spec circuit (Ws3) via the lead (Y). Then, coefficients of the coefficient circuits ($K_{30}$) ($K_{31}$) ($K_{32}$) ($K_{33}$) ($K_{34}$) of the respective short-spec circuits (Ws1) (Ws2) (Ws3) are set to values as shown in FIG. 36, so as to provide a second basic digital arithmetic non-oscillation circuit (d12).

Figure 37:
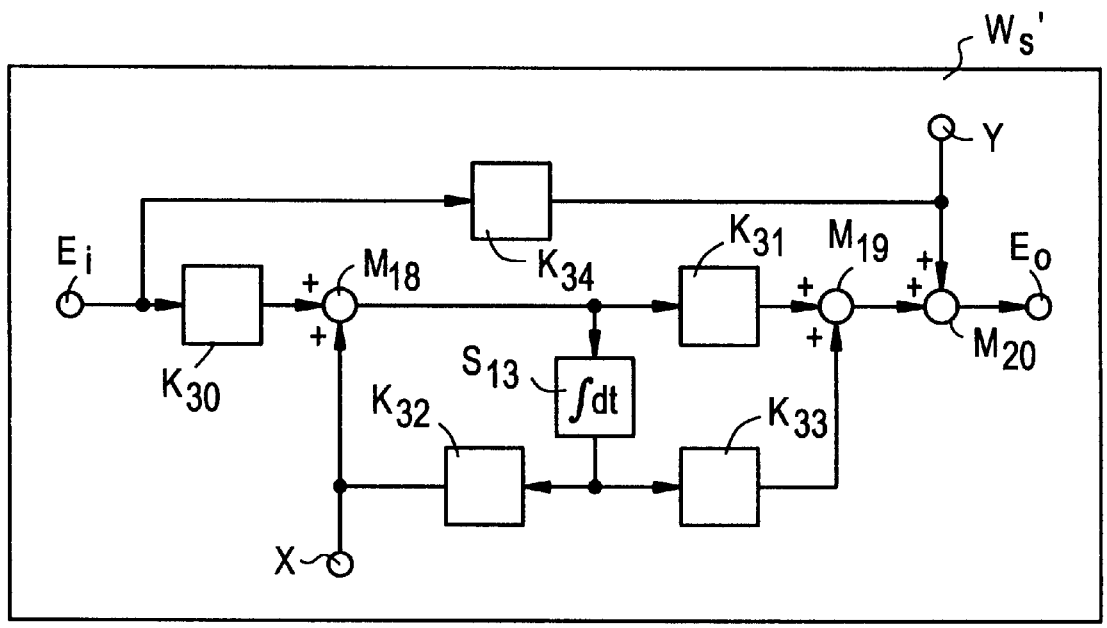
FIG. 37 is a circuit diagram of another example of a short-spec circuit of the present invention.

While three typical examples of the composite short-spec circuit II (Wsf2) have been illustrated above referring to FIGS. 34, 35 and 36, these examples will be now compared with one another to determine which one is most suitable for practical use. The examples of FIGS. 34 and 35 that use only two short-spec circuits (Ws1) (Ws2) to accomplish a desired function are superior in this respect to the embodiment of FIG. 36 that uses three short-spec circuits (Ws1) (Ws2) (Ws3) to accomplish the same function. Since the use of the leads (Y) (R) results in increases in the size and cost of the resulting integrated circuit, the example of FIG. 34 that uses only one lead (Y) is superior to the example of FIG. 35 that requires the use of two leads (Y), (R). To provide either the composite short-spec circuit I (Wsf1) as shown in FIG. 33 or the composite short-spec circuit II (Wsf2) as shown in FIG. 34, a short-spec circuit (Ws') provided with leads (X), (Y) may be constructed as shown in FIG. 37, and two of such short-spec circuit (Ws') may be connected to each other by means of these leads (X), (Y).

Figure 38:
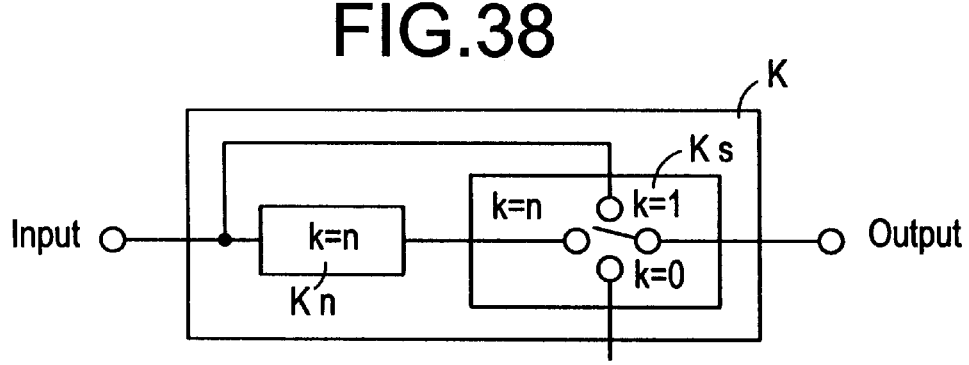
FIG. 38 is a circuit diagram showing an example of a coefficient circuit used in the generic digital arithmetic integrated circuit of the present invention.

Each of the coefficient circuits of the illustrated embodiments may be generally represented as a coefficient circuit (K) as shown in FIG. 38, which consists of a narrowly defined coefficient circuit (Kn) whose coefficient (k) can be set to an arbitrary value (n), and a logic switch (Ks) whose coefficient (k) can be set to a selected one of "1", "0" and "n". If the coefficient circuit is only required to set its coefficient (k) to either "1" or "0", the narrowly defined coefficient circuit (Kn) may be eliminated. Where the coefficient (k) is only switched between "1" and "0", unnecessary operating or computing steps will not be executed, and the operating speed will be thus increased.

Figure 39:
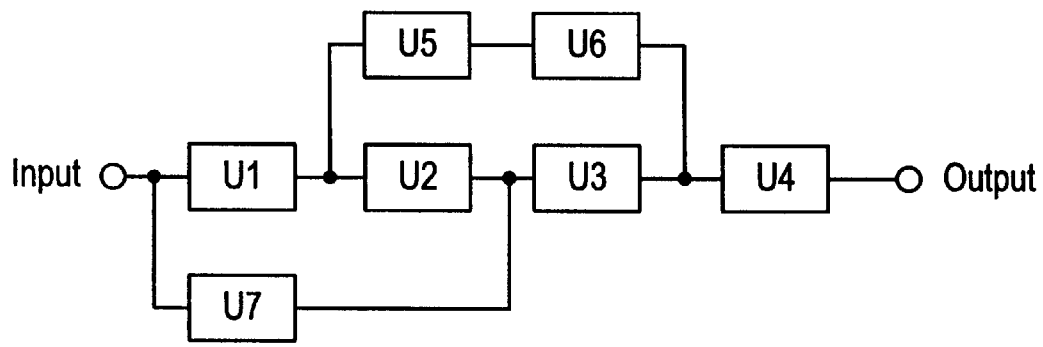
FIG. 39 is a view showing the configuration of generic digital arithmetic integrated circuits that are connected to each other to provided an expand network.
Figure 40:
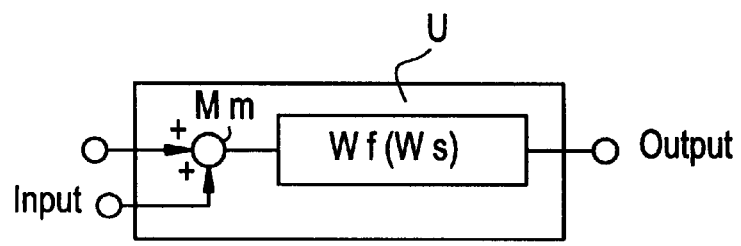
FIG. 40 is a circuit block diagram showing an example of a circuit unit used in the generic digital arithmetic integrated circuit of the present invention.

As another feature of the present invention, a plurality of units (U) of composite digital networks, such as full-spec circuits (Wf) and/or short-spec circuits (Ws), which provide various digital arithmetic circuits having different computing functions, may be arranged in rows and/or columns or may be superposed on each other to thus provide a multi-layer expanded network. FIG. 39 shows one example of this feature of the invention, in which circuit units (U1) (U2) (U3) (U4) (U6) (U7), which may be full-spec circuits (Wf) or short-spec circuits (Ws), are arranged in rows and columns and connected to each other to provide an expanded network. In this example, the circuit units (U1) through (U7) may be arranged in the expanded network such that at least a part of these units are superposed on each other to form a plurality of layers. To permit the circuit unit (U) to be connected to another unit to form the expanded network, the circuit unit (U) may further include a summing circuit (Mm) for circuit expansion and connection, which is advantageously added to the full-spec circuit (Wf) or short-spec circuit (Ws) or the like at the input side (output side in some cases) of the composite digital network. Also, the circuit units (U1) through (U7) may be formed as individual integrated circuits, or some of these circuit units may be formed as a unit into a fixed integrated circuit.

As is apparent from the illustrated embodiments, a composite digital network constructed as a combination of integrating circuits, summing circuits and coefficient circuits is formed as a fixed integrated circuit, and various digital arithmetic circuits having different computing functions are selectively constructed by changing coefficients of the coefficient circuits of this composite digital network. Thus, the integrated circuit as the composite digital network may be utilized for many purposes or applications, and the integrating circuits or summing circuits are more efficiently and effectively used. If a plurality of composite digital networks are arranged in rows or columns or superposed on each other to form a multi-layer structure, so as to provide an expanded two- or three-dimensional network, the scale or variety of computation can be easily increased, and the computing performance can be thus enhanced.

Figure 41:
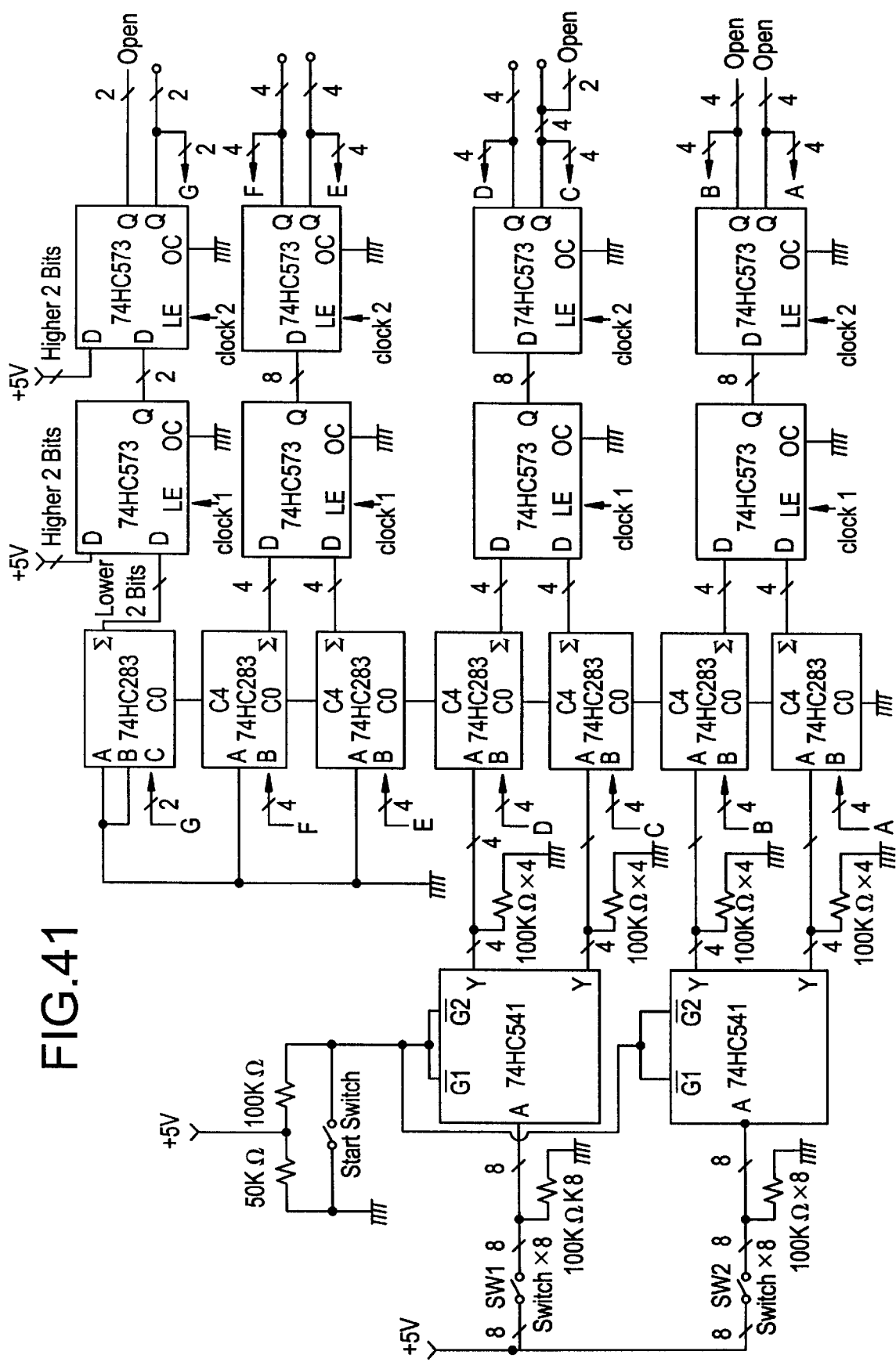
FIG. 41 is a view showing an example of an integrating circuit used in the generic digital arithmetic integrated circuit of the present invention.

One embodiment of the integrating circuit as the most fundamental partial circuit in the present invention is illustrated in FIG. 41. The circuit of this embodiment used for the purpose of reserch is fabricated by combining general purpose digital logic ICs that are easily available. In FIG. 41, 74C541, 74C283 and 74C573 represent "octal buffers and line drivers with 3-state output", "4-bit binary full adders with fast carry", and "octal transparent latches with 3-state output", respectively. Clock 1 and clock 2 have the same frequency but their phases are shifted from each other.

Suppose "integral time constant" is defined as a duration from the time when a certain value is given to the input by manually operating switches SW1, SW2 while both input and output are at zero level, to the time when a level of the output becomes equal to the input value, the integral time constant of the circuit of this embodiment is equal to 1 ms when the frequency of the clocks is set to 1 MHz. Suppose "quantize error" is defined as step-wise variations in the output which appears in the output amplitude within a duration corresponding to the integral time constant, the circuit of this embodiment has a quantize error of $\frac{1}{1000}$. If the quantize error is allowed to be as large as $\frac{1}{10}$, the integral time constant becomes 10 $\mu$s.

If the general purpose digital logic ICs used in this embodiment are replaced by high-speed digital logic ICs that can operate with clocks of 1 GHz, the resulting circuit has an integral time constant of 1 $\mu$s where the quantize error is equal to $\frac{1}{1000}$. If the quantize error is allowed to be as large as $\frac{1}{10}$, this circuit provides an integral time constant of 10 ns.

In a system in which a plurality of subsystems each consisting of the generic digital arithmetic integrated circuit of the present invention are cascaded or connected to each other to provide a network, each subsystem performs an operation at the speed as described above. Namely, the subsystems perform parallel operations at a high speed, which leads to a high processing capability of the system as a whole.

The disclosure of Japanese Patent Application No. 9166468 filed May 19, 1997, including specification, drawings and claims is herein incorporated by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A generic digital arithmetic integrated circuit comprising a composite digital network that includes at least one integrating circuit, at least one summing circuit and at least one coefficient circuit, said composite digital network being formed as a fixed integrated circuit, wherein at least one coefficient of said at least one coefficient circuit is changed so that the composite digital network provides a selected one of digital arithmetic circuits having different computing functions.

2. A generic digital arithmetic integrated circuit as defined in claim 1, wherein said composite digital network selectively constitutes a (said) basic digital arithmetic first-lag integration circuit in which a coefficient circuit ($K_1$), a summing circuit ($M_1$) and an integrating circuit ($S_1$) are connected in series, and a coefficient circuit ($K_2$) is connected between the other input terminal of said summing circuit ($M_1$) and an output terminal of said integrating circuit ($S_1$).

3. A generic digital arithmetic integrated circuit as defined in claim 1, wherein said composite digital network selectively constitutes a (said) basic digital arithmetic proportional integration circuit in which an integrating circuit ($S_2$), a coefficient circuit ($K_3$) and a summing circuit ($M_2$) are connected in series, and a coefficient circuit ($K_4$) is connected between an input terminal of said integrating circuit ($S_2$) and the other input terminal of said summing circuit ($M_2$).

4. A generic digital arithmetic integrated circuit as defined in claim 1, wherein said composite digital network selectively constitutes a (said) basic digital arithmetic approximate differentiation circuit in which a coefficient circuit ($K_5$) and a summing circuit ($M_3$) are connected in series, and an integrating circuit ($S_3$) and a coefficient circuit ($K_6$) are connected in series between an output terminal and the other input terminal of said summing circuit ($M_3$).

5. A generic digital arithmetic integrated circuit as defined in claim 1, wherein said composite digital network selectively constitutes a (said) basic digital arithmetic proportional differentiation circuit in which a coefficient circuit ($K_7$), a summing circuit ($M_4$), a coefficient circuit ($K_8$) and a summing circuit ($M_5$) are connected in series, and an integrating circuit ($S_4$) and a coefficient circuit ($K_9$) are connected in series between an output terminal and the other input terminal of said summing circuit ($M_4$), while a coefficient circuit ($K_{10}$) is connected between an input terminal of said coefficient circuit ($K_7$) and the other input terminal of said summing circuit ($M_5$).

6. A generic digital arithmetic integrated circuit as defined in claim 1, wherein said composite digital network selectively constitutes a (said) basic digital arithmetic phase compensation circuit in which a coefficient circuit ($K_{11}$), a summing circuit ($M_6$) and a summing circuit ($M_7$) are connected in series, and an integrating circuit ($S_5$) and a coefficient circuit ($K_{12}$) are connected between an output terminal and the other input terminal of said summing circuit ($M_6$), while said integrating circuit ($S_5$) and a coefficient circuit ($K_{13}$) are connected in series between the output terminal of said summing circuit ($M_6$) and the other input terminal of said summing circuit ($M_7$).

7. A generic digital arithmetic integrated circuit as defined in claim 1, wherein said composite digital network selectively constitutes a (said) first basic digital arithmetic non-oscillation circuit in which a coefficient circuit ($K_{14}$), a summing circuit ($M_8$) and an integrating circuit ($S_6$) are connected in series, and an integrating circuit ($S_7$), a coefficient circuit ($K_{15}$) and a summing circuit ($M_9$) are connected in series between an output terminal of said integrating circuit ($S_6$) and the other input terminal of said summing circuit ($M_8$), while a coefficient circuit ($K_{16}$) is connected between the output terminal of the integrating circuit ($S_6$) and the other input terminal of the summing circuit ($M_9$).

8. A generic digital arithmetic integrated circuit as defined in claim 1, wherein said composite digital network selectively constitutes a (said) second basic digital arithmetic non-oscillation circuit in which a coefficient circuit ($K_{17}$), a coefficient circuit ($K_{18}$), a summing circuit ($M_{10}$) and a summing circuit ($M_{11}$) are connected in series, and an integrating circuit ($S_8$) is connected between an input terminal of said coefficient circuit ($K_{18}$) and the other input terminal of said summing circuit ($M_{10}$), while a coefficient circuit ($K_{19}$), a summing circuit ($M_{12}$) and a coefficient circuit ($K_{20}$) are connected in series between the input terminal of the coefficient circuit ($K_{18}$) and the other input terminal of said summing circuit ($M_{11}$), and an integrating circuit ($S_9$) and a coefficient circuit ($K_{21}$) are connected in series between an output terminal and the other input terminal of said summing circuit ($M_{12}$).

9. A generic digital arithmetic integrated circuit as defined in claim 1, wherein each of at least one of said coefficient circuits used for providing a selected one of the digital arithmetic circuits or basic digital arithmetic circuits comprises a logic switch capable of switching a coefficient k of said each coefficient circuit between 1 and 0.

10. A generic digital arithmetic integrated circuit as defined in claim 1, wherein said composite digital network is provided with a summing circuit for circuit expansion and connection, which is connected to at least one of input and output terminals of the composite digital network.

11. A generic digital arithmetic integrated circuit comprising a plurality of circuit units each comprising a composite digital network that includes at least one integrating circuit, at least one summing circuit and at least one coefficient circuit, wherein at least one coefficient of said at least one coefficient circuit is changed so that the composite digital network provides a selected one of digital arithmetic circuits having different computing functions, and wherein said plurality of circuit units are arranged and connected to each other in at least one direction of rows, columns and layers, to provide an expanded network, so that said circuit units are formed as a fixed integrated circuit.

12. A generic digital arithmetic integrated circuit comprising a composite digital network that includes at least one integrating circuit, at least one summing circuit and at least one coefficient circuit, said composite digital network being formed as a fixed integrated circuit, wherein at least one coefficient of said at least one coefficient circuit is changed so that said composite digital network selectively provides at least one of two or more basic digital arithmetic circuits, out of a plurality of types of basic digital arithmetic circuits having different computing functions.

13. A generic digital arithmetic integrated circuit as defined in claim 12, wherein said plurality of types of basic digital arithmetic circuits comprise a basic digital arithmetic first-order lag integration circuit, a basic digital arithmetic proportional integration circuit, a basic digital arithmetic approximate differentiation circuit, a basic digital arithmetic proportional differentiation circuit, a basic digital arithmetic phase compensation circuit, a first basic digital arithmetic non-oscillation circuit and a second basic digital arithmetic non-oscillation circuit, each of which includes at least one integrating circuit, at least one summing circuit and at least one coefficient circuit.

14. A generic digital arithmetic integrated circuit comprising a plurality of circuit units each comprising a composite digital network that includes at least one integrating circuit, at least one summing circuit and at least one coefficient circuit, wherein at least one coefficient of said at least one coefficient circuit being changed so that said composite digital network selectively provides at least one of two or more basic digital arithmetic circuits, out of a plurality of types of basic digital arithmetic circuits having different computing functions, and wherein said plurality of circuit units are arranged and connected to each other in at least one direction of rows, columns and layers, to provide an expanded network, so that said circuit units are formed as a fixed integrated circuit.

15. A generic digital arithmetic integrated circuit comprising a composite digital network that is formed as a fixed integrated circuit wherein a coefficient circuit ($K_{22}$), a summing circuit ($M_{13}$), a coefficient circuit ($K_{23}$), a summing circuit ($M_{14}$) and a summing circuit ($M_{15}$) are connected in series, and an integrating circuit ($S_{10}$), a coefficient circuit ($K_{24}$) and a summing circuit ($M_{16}$) are connected in series between an output terminal and the other input terminal of said summing circuit ($M_{13}$), wherein an integrating circuit ($S_{10}$) and a coefficient circuit ($K_{25}$) are connected in series between the output terminal of said summing circuit ($M_{13}$) and the other input terminal of said summing circuit ($M_{14}$), and an integrating circuit ($S_{11}$) and a coefficient circuit ($K_{26}$) are connected in series between an output terminal of said coefficient circuit ($K_{25}$) and the other input terminal of said summing circuit ($M_{16}$), and wherein a coefficient circuit ($K_{27}$), a summing circuit ($M_{17}$) and a coefficient circuit ($K_{28}$) are connected in series between the output terminal of the summing circuit ($M_{13}$) and the other input terminal of the summing circuit ($M_{15}$), and an integrating circuit ($S_{12}$) and a coefficient circuit ($K_{29}$) are connected in series between an output terminal and the other input terminal of said summing circuit ($M_{17}$), at least one coefficient of the coefficient circuits being changed so that said composite digital network provides a selected one of a basic digital arithmetic first-order lag integration circuit, a basic digital arithmetic proportional integration circuit, a basic digital arithmetic approximate integration circuit, a basic digital arithmetic proportional differentiation circuit, a basic digital arithmetic phase compensation circuit, a first basic digital arithmetic non-oscillation circuit, and a second basic digital arithmetic non-oscillation circuit.

16. A generic digital arithmetic integrated circuit comprising a plurality of circuit units each of which comprises a composite digital network wherein a coefficient circuit ($K_{22}$), a summing circuit ($M_{13}$), a coefficient circuit ($K_{23}$), a summing circuit ($M_{14}$) and a summing circuit ($M_{15}$) are connected in series, and an integrating circuit ($S_{10}$), a coefficient circuit ($K_{24}$) and a summing circuit ($M_{16}$) are connected in series between the output terminal and the other input terminal of said summing circuit ($M_{13}$), wherein an integrating circuit ($S_{10}$) and a coefficient circuit ($K_{25}$) are connected in series between an output terminal of said summing circuit ($M_{13}$) and the other input terminal of said summing circuit ($M_{14}$), and an integrating circuit ($S_{11}$) and a coefficient circuit ($K_{26}$) are connected in series between an output terminal of said coefficient circuit ($K_{25}$) and the other input terminal of said summing circuit ($M_{16}$), and wherein a coefficient circuit ($K_{27}$), a summing circuit ($M_{17}$) and a coefficient circuit ($K_{28}$) are connected in series between the output terminal of said summing circuit ($M_{13}$) and the other input terminal of said summing circuit ($M_{15}$), and an integrating circuit ($S_{12}$) and a coefficient circuit ($K_{29}$) are connected in series between an output terminal and the other input terminal of said summing circuit ($M_{17}$), at least one coefficient of said coefficient circuits being changed so that said composite digital network provides a selected one of a basic digital arithmetic first-order lag integration circuit, a basic digital arithmetic proportional integration circuit, a basic digital arithmetic approximate integration circuit, a basic digital arithmetic proportional differentiation circuit, a basic digital arithmetic phase compensation circuit, a first basic digital arithmetic non-oscillation circuit, and a second basic digital arithmetic non-oscillation circuit, said plurality of circuit units being arranged and connected to each other in at least one direction of rows, columns and layers, to provide an expanded network, so that said circuit units are formed as a fixed integrated circuit.

17. A generic digital arithmetic integrated circuit comprising a composite digital network that is formed as a fixed integrated circuit wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of said summing circuit ($M_{18}$), and wherein said integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of said coefficient circuit ($K_{30}$) and the other input terminal of said summing circuit ($M_{20}$), at least one coefficient of said coefficient circuits being changed so that said composite digital network provides a selected one of a basic digital arithmetic first-order lag integration circuit, a basic digital arithmetic proportional integration circuit, a basic digital arithmetic approximate integration circuit, a basic digital arithmetic proportional differentiation circuit, and a basic digital arithmetic phase compensation circuit.

18. A generic digital arithmetic integrated circuit comprising a composite digital network that is formed as a fixed integrated circuit wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of said summing circuit ($M_{18}$), wherein said integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of said coefficient circuit ($K_{30}$) and the other input terminal of said summing circuit ($M_{20}$), and wherein a first lead (X) and a second lead (Y) are connected to the other input terminal of said summing circuit ($M_{18}$) and the other input terminal of said summing circuit ($M_{20}$), respectively, at least one coefficient of said coefficient circuits being changed so that said composite digital network provides a selected one of a basic digital arithmetic first-order lag integration circuit, a basic digital arithmetic proportional integration circuit, a basic digital arithmetic approximate integration circuit, a basic digital arithmetic proportional differentiation circuit, and a basic digital arithmetic phase compensation circuit.

19. A generic digital arithmetic integrated circuit comprising a plurality of circuit units each of which comprises a composite digital network wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of said summing circuit ($M_{18}$), and wherein said integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of said coefficient circuit ($K_{30}$) and the other input terminal of said summing circuit ($M_{20}$), at least one coefficient of said coefficient circuits being changed so that said composite digital network provides a selected one of a basic digital arithmetic first-order lag integration circuit, a basic digital arithmetic proportional integration circuit, a basic digital arithmetic approximate integration circuit, a basic digital arithmetic proportional differentiation circuit, and a basic digital arithmetic phase compensation circuit, said plurality of circuit units being arranged and connected to each other in at least one direction of rows, columns and layers, to provide an expanded network, so that said circuit units are formed as a fixed integrated circuit.

20. A generic digital arithmetic integrated circuit comprising first and second composite digital networks (Ws1) (Ws2) having the same circuit pattern wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of said summing circuit ($M_{18}$), and wherein said integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of said coefficient circuit ($K_{30}$) and the other input terminal of said summing circuit ($M_{20}$), an output terminal of said summing circuit ($M_{20}$) of said first composite digital network (Ws1) being connected to the input terminal of said coefficient circuit ($K_{30}$) of said second composite digital network (Ws2), an output terminal of said summing circuit ($M_{20}$) of said second composite digital network (Ws2) being connected to the other input terminal of said summing circuit ($M_{18}$) of said first composite digital network (Ws1), said first and second composite digital networks (Ws1) (Ws2) being formed as a fixed integral circuit that provides a first basic digital arithmetic non-oscillation circuit by setting a coefficient of each of the coefficient circuits in the first and second composite digital networks (Ws1) (Ws2).

21. A generic digital arithmetic integrated circuit comprising first and second composite digital networks (Ws1) (Ws2) having the same circuit pattern wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of said summing circuit ($M_{18}$), and wherein said integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of said coefficient circuit ($K_{30}$) and the other input terminal of said summing circuit ($M_{20}$), an output terminal of said summing circuit ($M_{20}$) of said first composite digital network (Ws1) being connected to the other input terminal of said summing circuit ($M_{20}$) of said second composite digital network (Ws2), the input terminal of said coefficient circuit ($K_{30}$) of said first composite digital network being connected to the input terminal of said coefficient circuit ($K_{30}$) of said second composite digital network (Ws2), said first and second composite digital networks (Ws1) (Ws2) being formed as a fixed integrated circuit that provides a second basic digital arithmetic non-oscillation circuit by setting a coefficient of each of the coefficient circuits in the first and second composite digital networks (Ws1) (Ws2).

22. A generic digital arithmetic integrated circuit comprising first and second composite digital networks (Ws1) (Ws2) having the same circuit pattern wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of said summing circuit ($M_{18}$), and wherein said integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of said coefficient circuit ($K_{30}$) and the other input terminal of said summing circuit ($M_{20}$), an output terminal of said summing circuit ($M_{20}$) of said first composite digital network (Ws1) being connected to the other input terminal of said summing circuit ($M_{20}$) of said second composite digital network (Ws2), an output terminal of said coefficient circuit ($K_{30}$) of said first composite digital network (Ws1) being connected to an input terminal of said summing circuit ($M_{30}$) of said second composite digital network (Ws2), said first and second composite digital networks (Ws1) (Ws2) being formed as a fixed integrated circuit that provides a second basic digital arithmetic non-oscillation circuit by setting a coefficient of each of the coefficient circuits in the first and second composite digital networks (Ws1) (Ws2).

23. A generic digital arithmetic integrated circuit comprising first, second and third composite digital networks (Ws1) (Ws2) (Ws3) having the same circuit pattern wherein a coefficient circuit ($K_{30}$), a summing circuit ($M_{18}$), a coefficient circuit ($K_{31}$), a summing circuit ($M_{19}$) and a summing circuit ($M_{20}$) are connected in series, and an integrating circuit ($S_{13}$) and a coefficient circuit ($K_{32}$) are connected in series between an output terminal and the other input terminal of said summing circuit ($M_{18}$), and wherein said integrating circuit ($S_{13}$) and a coefficient circuit ($K_{33}$) are connected in series between the output terminal of the summing circuit ($M_{18}$) and the other input terminal of the summing circuit ($M_{19}$), and a coefficient circuit ($K_{34}$) is connected between an input terminal of said coefficient circuit ($K_{30}$) and the other input terminal of said summing circuit ($M_{20}$), an output terminal of said summing circuit ($M_{20}$) of said first composite digital network (Ws1) being connected to the input terminal of said coefficient circuit ($K_{30}$) of each of said second composite digital network (Ws2) and said third composite digital network (Ws3), an output terminal of said summing circuit ($M_{20}$) of said second composite digital network (Ws2) being connected to the other input terminal of said summing circuit ($M_{20}$) of said third composite digital network (Ws3), said first, second and third composite digital networks (Ws1) (Ws2) (Ws3) being formed as a fixed integrated circuit that provides a second basic digital arithmetic non-oscillation circuit by setting a coefficient of each of the coefficient circuits in the first, second and third composite digital networks (Ws1) (Ws2) (Ws3).

24. A method for producing a generic digital arithmetic integrated circuit, comprising the steps of:

converting a plurality of types of basic analog arithmetic circuits having different computing functions into respective equivalent analog circuits;

obtaining expressions representing current-voltage relationships on input and output sides of each of said equivalent analog circuits;

defining a plurality of basic digital arithmetic circuits that respectively correspond to said basic analog arithmetic circuits, each of said basic digital arithmetic circuits being designed by locating digital arithmetic elements according to the expressions of the current-voltage relationships; and connecting said plurality of basic digital arithmetic circuits via at least one coefficient circuit each having an ON/OFF switching function.

* * * * *